(12) United States Patent
Hare et al.

(10) Patent No.: US 8,347,313 B2
(45) Date of Patent: Jan. 1, 2013

(54) METHOD AND APPARATUS FOR AUTOMATING ORGANIZATION OF PROCESSES

(75) Inventors: Jonathan Hare, San Francisco, CA (US); Mathew Spolin, San Francisco, CA (US)

(73) Assignee: Resilient Networks, Inc., San Francisco, CA (US)

( * ) Notice: Subject to any disclaimer, the term of this patent is extended or adjusted under 35 U.S.C. 154(b) by 478 days.

(21) Appl. No.: 12/564,868

(22) Filed: Sep. 22, 2009

(65) Prior Publication Data

US 2010/0169888 A1  Jul. 1, 2010

Related U.S. Application Data

(63) Continuation of application No. 10/853,025, filed on May 21, 2004, now abandoned.

(60) Provisional application No. 60/472,566, filed on May 21, 2003.

(51) Int. Cl.
*G06F 9/44* (2006.01)
(52) U.S. Cl. ......... 719/313; 719/315; 719/316; 719/328
(58) Field of Classification Search ............... 709/328, 709/204, 238; 719/328, 329, 330, 331, 332, 719/313, 315, 316, 320; 705/8
See application file for complete search history.

(56) References Cited

U.S. PATENT DOCUMENTS

| | | | |
|---|---|---|---|
| 2002/0091768 A1* | 7/2002 | Balasubramanian | 709/204 |
| 2003/0037181 A1* | 2/2003 | Freed | 709/328 |
| 2004/0002885 A1* | 1/2004 | Levy | 705/8 |
| 2004/0059828 A1* | 3/2004 | Hooper et al. | 709/238 |
| 2004/0181577 A1* | 9/2004 | Skurikhin et al. | 709/204 |

* cited by examiner

*Primary Examiner* — Le H Luu
(74) *Attorney, Agent, or Firm* — Dergosits & Noah LLP

(57) ABSTRACT

Methods, apparatuses, and systems are presented for automating organization of multiple processes involving maintaining a uniform record of process threads using at least one server, each process thread comprising a representation of a collaborative process capable of involving a plurality of users, enabling at least one of the plurality of users to carry out a user action while interacting with one of a plurality of different types of application programs, and modifying at least one process thread in the uniform record of process threads in response to the user action carried out by the user. Modifying the at least one process thread may comprise generating the at least one process thread as a new process thread. Alternatively or in addition, modifying the at least one process thread may comprise modifying the at least one process thread as an existing process thread. At least one of the process threads may reflect user actions carried out by more than one of the plurality of users.

25 Claims, 5 Drawing Sheets

METHOD AND APPARATUS FOR AUTOMATING ORGANIZATION OF PROCESSES

CROSS-REFERENCES TO RELATED APPLICATIONS

This application is a continuation of U.S. application Ser. No. 10/853,025, Virtual Process Collaboration, by Jonathan Hare et al., filed May 21, 2004, which claims the benefit of U.S. Provisional Application No. 60/472,566, entitled VIRTUAL PROCESS COLLABORATION, by Jonathan Hare et al., filed May 21, 2003, the disclosures of which are hereby incorporated by reference.

BACKGROUND OF THE INVENTION

Traditional enterprise applications automate the repeated execution of a particular set of domain-specific processes. Once deployed, enterprise applications promise to improve the consistency, transparency, security, and efficiency of the processes they automate. Yet traditional approaches to process automation often fail because they assume that these processes can be translated in advance into well-defined work flows, data structures and rules.

Enterprise applications must be implemented, configured/customized and installed before they can be used. Significant changes or extensions to the default process model in the application generally requires significant technical expertise, and require analysis of what process model changes are necessary or pragmatically achievable. Once deployed, the users of such enterprise applications are constrained to a limited range of variations of the processes embedded in the application.

These fundamental characteristics of enterprise applications conflict with how real world business practices are actually conducted, because most business processes are more improvised than structured. This is especially true for managerial, knowledge-intensive, and cross-organizational processes that comprise the majority of high value business activities. Such processes are adapted, pieced together, customized, or defined on the fly by people. They do not fit neatly within the functional boundaries of individual enterprise applications. A given participant may need to have access to information drawn from different activities managed by different organizations and people and/or contained in different applications or systems in order to make informed decisions.

The diversity of processes, both in terms of the different types of processes and the variations within each type, is vast—far larger than could be supported by any given application. Moreover, processes often reflect ad hoc judgments of people dealing with specific situations as opposed to pre-defined and consistently applied rules. Even when a process does follow consistent patterns, its details—the decisions made and the specific people, documents, application transactions, and emails involved—are improvised upon execution.

Because structured automation techniques employed by enterprise applications are simply unable to support improvised processes, people rely heavily on email and personal productivity applications such as spreadsheets or word processors to perform, coordinate and track their work. The characteristics of such shrink-wrapped applications are virtually the antithesis of enterprise applications—they trade off much of the security, consistency, automation, transparency, and auditability benefits promised by enterprise applications in the interests of supporting improvised processes.

Email, for example, is a domain neutral and general purpose collaboration tool which has limited capabilities, specifically the ability to send, reply and forward messages and attachments. While email is incredibly flexible and ubiquitous, it lacks the ability to maintain security, to provide end-to-end transparency, or to automate or enforce consistent processes. Email threads by their nature are fragile and prone to fragmentation with every reply or forward, leaving disconnected messages and attachments scattered across different email servers and clients. Email has no mechanism to enable senders to maintain control or visibility over messages or content they have sent, and there is no reliable or automated way to 'connect the dots' of related email threads. Even so, the ability to support improvisation using email systems and the general purpose capabilities of such systems make them by far the most heavily used software for supporting improvised, collaborative processes.

Therefore, the execution of any given instance of an end-to-end process relies upon a variety of different types of email and collaboration tools, desktop productivity applications, and enterprise applications. Each instance of such a process grows organically, leaving a scattered trail of documents, emails, application transactions, decisions, and fading human memories as they unfold. There is no consistent end-to-end mechanism for storing, linking or otherwise recording the disparate elements of information content and improvised decision context that would be necessary to understand an individual instance of a process. Traditional enterprise applications are fundamentally incapable of accommodating the need for ad hoc collaboration and improvised processes, or the degree of diversity and change in structured processes.

The result is a widespread and profound lack of transparency and accountability in day-to-day business practices. It is often difficult or impossible to find relevant documents, files or application transactions necessary for informed decisions, to determine what decisions have been made or approved by whom on what basis, to see what tasks are pending or completed, or simply to find out who is involved.

BRIEF SUMMARY OF THE INVENTION

The present invention relates to methods, apparatuses, and systems for automating organization of multiple processes involving maintaining a uniform record of process threads using at least one server, each process thread comprising a representation of a collaborative process capable of involving a plurality of users, enabling at least one of the plurality of users to carry out a user action while interacting with one of a plurality of different types of application programs, and modifying at least one process thread in the uniform record of process threads in response to the user action carried out by the user.

Modifying the at least one process thread may comprise generating the at least one process thread as a new process thread. Alternatively or in addition, modifying the at least one process thread may comprise modifying the at least one process thread as an existing process thread. At least one of the process threads may reflect user actions carried out by more than one of the plurality of users.

One of the different types of application programs may be an email application program. One of the different types of application programs may be a web application program. One of the different types of application programs may be an enterprise application program. A piece of electronic content may also be associated to at least one process thread in the uniform collection of process threads. The piece of electronic content may be a piece of content selected from the group consisting of application transaction record, document, form, web page, fax, and email.

A predefined process service may also be applied to at least one process thread in the uniform collection of process threads, wherein the predefined process service is capable of providing a specific function to serve the at least one process thread. A predefined thread service may also be applied to at least one process thread in the uniform collection of process threads, wherein the predefined thread service manages operations associated with the at least one process thread. At least one of the process threads may be comprised of a plurality of process primitives, each process primitive corresponding to at least one basic function relating to operation of a process.

DETAILED DESCRIPTION OF THE INVENTION

Figure 1:
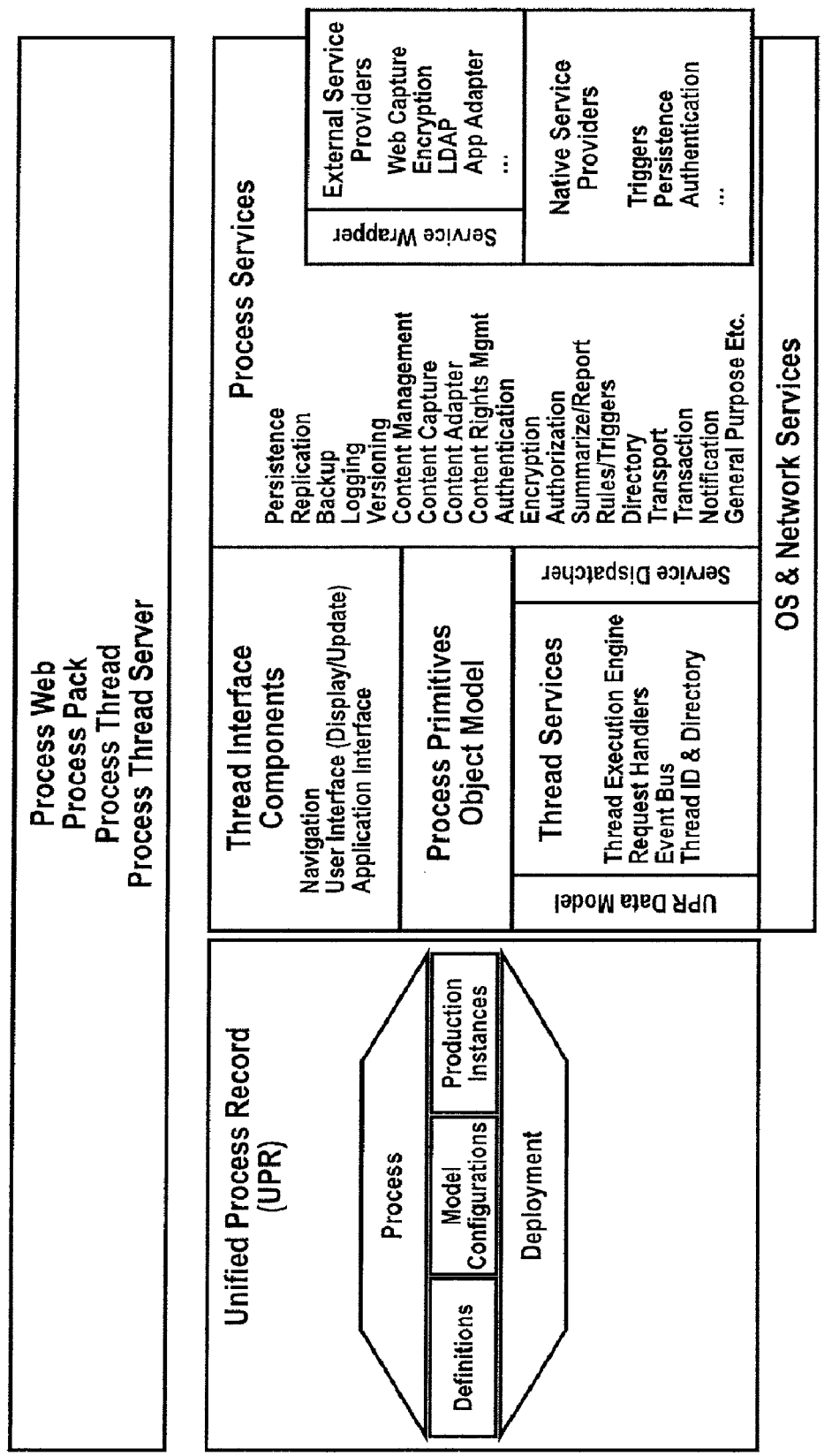
FIG. 1 illustrates a functional diagram of a system for organizing collaborative processes in accordance with at least one embodiment of the present invention.

FIG. 1 illustrates a functional diagram of a system for organizing collaborative processes in accordance with at least one embodiment of the present invention. As shown in the figure, the system may include one or more of a number of higher level elements such as Process Web, Process Pack, Process Thread, and Process Thread Server. These higher level elements are based on a number of lower level elements, such as Process Primitives Objects Model, Unified Process Record (UPR), Thread Interface Components, Thread Service, and Process Services. The various elements shown in FIG. 1 are described in further detail in sections below.

Figure 2:
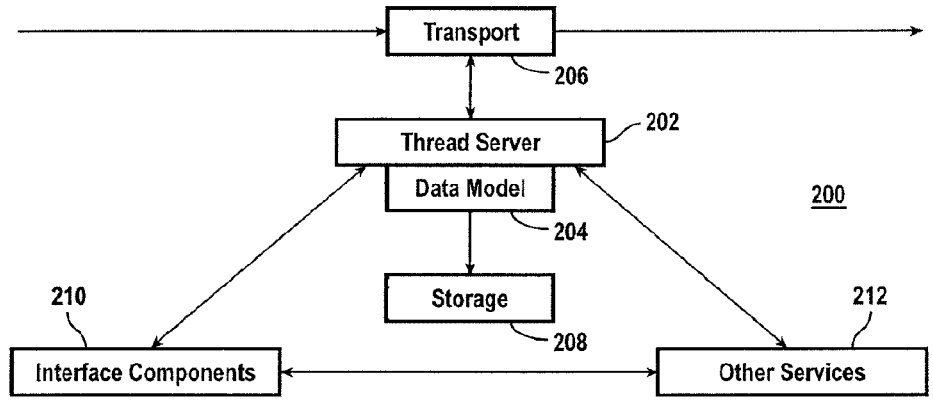
FIG. 2 presents a computer system and its associated message flows in accordance with one embodiment of the present invention.

According to one embodiment of the invention, the system illustrated in FIG. 1 may be implemented as one or more computer systems and associated UPR data. FIG. 2 presents a computer system 200 and its associated message flows in accordance with one embodiment of the present invention. Here, computer system 200 includes the following software subsystems:

i. Process Thread Server 202, incorporating a realization of the UPR data model 204
ii. one or more transport services 206
iii. one or more storage services 208
iv. zero or more Thread Interface Components 210
v. a set of process services 212

As shown in FIG. 2, various arrow directions indicates possible message flows associated with computer system 200. Such message flows may relate to a persistent data form of threads representing collaborative processes, organized according to data model 204 and stored using storage service 208. For example, requests relating to one or more threads may enter compute system 200 through transport service 206. Requests may also be routed internally via an internal transport service (not shown). Process Thread Server 202 reads the request and dispatches it to a Thread Interface Component 210 (typically for an external request) or a known service 212 (typically for internally generated requests).

In the case of an external request, the Thread Interface Component 210 may interact with services 212, other Thread Interface Components 210 and Process Thread Server 202. Data requests (reads and writes) may be mediated by Process Thread Server 202 via data model 204. Some requests may involve services or Thread Interface Components (not shown) external to the system. These requests are typically mediated by Process Thread Server 202 via the appropriate transport service 206. An instance of computer system 200 may also be connected to any number of other instances via a transport, such as transport service 206. An instance may also communicate with other agents and resources via a transport.

1 Process Thread Server

According to one embodiment of the present invention, a general purpose application program, referred to here as a Process Thread Server, is utilized to automate the process of defining, executing, recording, browsing and reusing arbitrary process definitions and instances within arbitrary process domains by various users. Process Thread Servers may allow users to incrementally define and execute processes and support diverse, interconnected, continuously evolving and ad hoc improvised processes. These improvised processes may be defined on the fly by their participants without centralized control; incorporating new information content, rules, process model patterns and new participants as they unfold. Process participants may be able to capture or link in information from enterprise applications, web sites, desk top productivity applications that they are already using to a unified record, such as a Unified Process Record (UPR), maintained by Process Thread Servers.

Figure 3:
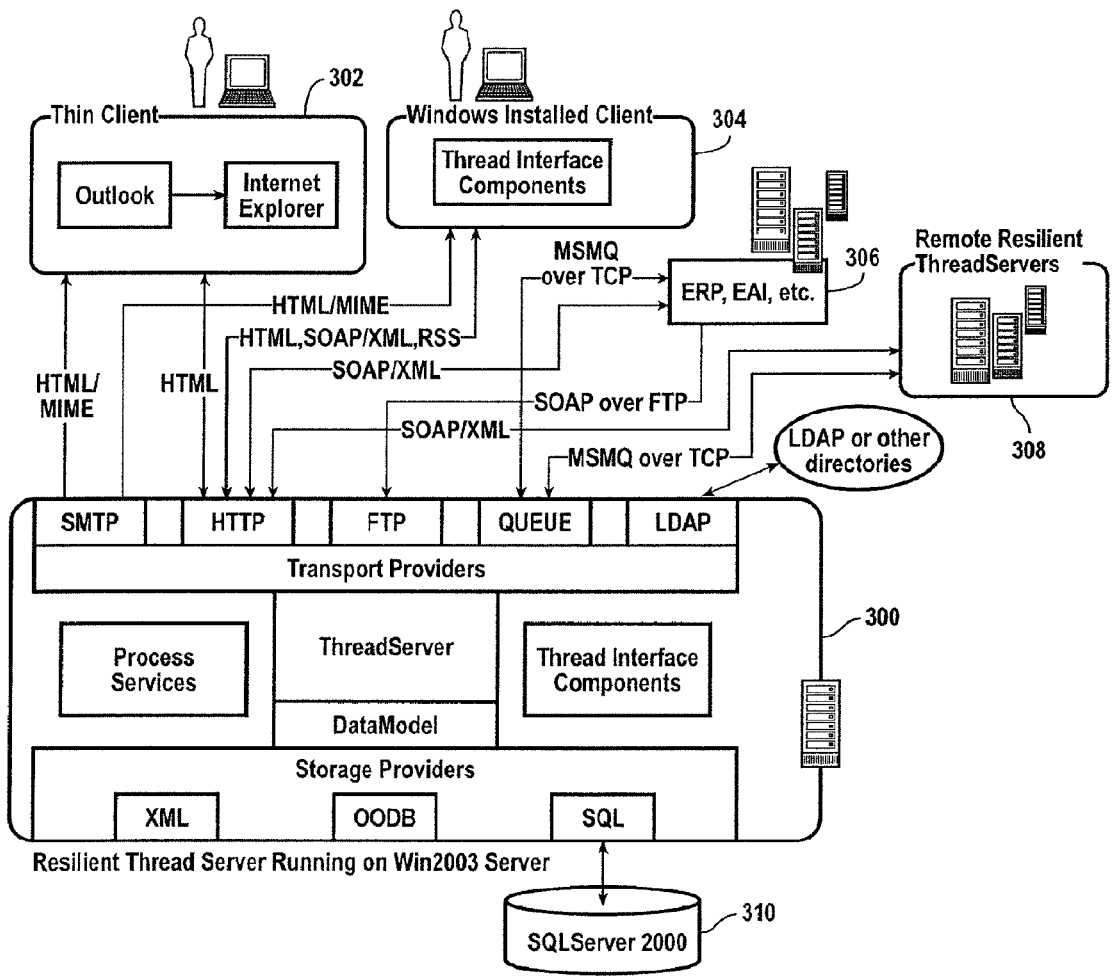
FIG. 3 is a block diagram of a Process Thread Server operating in potential environment according to one embodiment of the present invention.

FIG. 3 is a block diagram of a Process Thread Server 300 operating in potential environment according to one embodiment of the present invention. Process Thread Server 300 may communicate with a variety of different computing devices. These may include a thin client 302, an installed client 304, other servers 306, other Process Thread Servers 308, and one or more storage devices 310. Here, Process Thread Server 300 incorporates an email and a web server, enabling users to interact with Process Thread Server 300 from their existing and unmodified clients. For example, a user may use an existing email client such as Outlook and/or and existing web client such as Internet Explorer. Other clients may certainly be used, such as RSS and others. A Process Thread Servers does not necessarily have to include a web server or an emails server. These servers may be implemented in other computing devices which communicate with the Process Thread Server. As shown FIG. 3, Process Thread Server 300 may communicate with other devices using a variety of different communication protocols and configurations. These may include but are not necessarily limited to Hypertext Markup Language (HTML), Multi-purpose Internet Mail Extensions (MIME), Simple Mail Transfer Protocol (SMTP), Hypertext Transfer Protocol (HTTP), Microsoft Message Queuing (MSMQ), Transmission Control Protocol (TCP), Simple Object Access Protocol (SOAP), Extensible Markup Language (XML), Resource Description Framework Site Summary (RSS), and Lightweight Directory Access Protocol (LDAP). Various types storage providers may be for Process Thread Server, such as (XLM), Object-oriented Database (OODB), and/or Structured Query Language (SQL) storage providers.

Process Thread Servers may have built-in support for defining and executing the common building blocks of any process—reviews, approvals, delegation, assignments, messages, reminders, forms, security, rules, etc. They may function as a built-in project manager and personal assistant for process participants, keeping the information about the processes they stores organized, accessible and secure, reminding participants of pending or late deliverables, etc.

Unlike traditional enterprise applications, a Process Thread Server is not necessarily limited to automating the repeated execution of instances of a pre-defined or limited range of variations within a fixed set of domain-specific process definitions. A typical enterprise application may be domain-specific in the sense that it is designed for a particular type of process (i.e. inventory management, financial accounting, risk-analysis, configuration management, etc.) and/or a particular variation for industries, functions or individual organizations (i.e. inventory management for pharmaceuticals distributors). In one embodiment of the invention, a Process Thread Server may combine the productivity, transparency, accountability, consistency and security capabilities of traditional enterprise applications with the unique ability of email to serve as a general purpose application that supports real-time improvisation.

According to one embodiment of the invention, logical accesses to the Unified Process Record (UPR) are performed by the Process Thread Server on behalf of other services or components. For example, physical access, i.e., reading/writing of bits to media, is typically performed by a storage service mediated by the Process Thread Server's Data Model. In the present embodiment of the invention, the Process Thread Server may comprise the following modules:

An executive containing the system's initial point of execution
One or more Request Handlers
A Service Dispatcher and a set of known Service signatures
A realization of the UPR data model
A realization of the UPR object model
An internal event bus A minimal Process Thread Server may be provisioned with a transport provider (to provide a means of receiving and responding to external and internal requests). The server may also need to access to a storage provider (as UPR data may be durable, and actions may be logged persistently). The various modules included in the Process Thread Server in present embodiment are listed below.

The executive module contains the system's initial point of execution. On startup, the executive reads configuration data specifying binding information for service providers (logging, storage, the various transports, etc) and determines what request handlers to start. The executive may then spawn O/S threads to run the configured request handlers. Each request handler listens for requests on its channel(s). Based on type and content of request and configuration state, either the handler directly deals with the request or it dispatches the request for asynchronous handling. A channel denotes a communication medium or source of requests. It is typically a combination of a particular transport service and an address known to that transport. (Examples: HTTP on Port 80, POP3 mailbox, the 'Jobs' queue). A request may be dispatched for asynchronous execution by (1) sending the request to a (typically other) request handler's channel; or (2) spawning a worker (O/S) thread to process the request. Requests may originate from outside the system or within the system (see FIG. 2). External requests are typically satisfied by Thread Interface Components, though the code handling the request may call various services before or after calling the designated Thread Interface Component. (Example: HTTP GET request for an ASP.Net page is authenticated and logged before passing it to the requested page for processing). A service dispatcher refers to a mechanism that decouples knowledge of a service's capabilities from provisioning and implementation details. One implementation uses the Sun's API/SPI pattern (application programming interface/service provider interface). Another implementation requires registering a facade/adapter class for a given provider. A base set of well known services may used internally by the Process Thread Server. Some of these may have internal providers, while others depend on the existence of an external provider. New services can be registered with the dispatcher. This extension mechanism allows threads and services to call services which were not known to the Thread Server when it was created or began. Also, the Process Thread Server may utilize an internal event bus supports decoupled communication between system parts.

2 Process Threads

According to one embodiment of the present invention, executable and persistent records, referred to here as Process Threads, may relate to the history, current status and/or anticipated future of one or more process instances, each of which may grow dynamically as the underlying process unfolds. A Process Thread may include a record of the process model definitions or decisions that were copied, improvised or linked in as the process unfolded. It may include copies of, links to, captured representations or distillations of relevant messages, files, web pages, faxes, application transactions, web services or other information content that can be electronically stored, addressed and/or remotely accessed. It may include a record of the people and systems that participated in the process, who invited them, and how they participated. Moreover, a Process Thread may maintain a record of the interrelationships between each of these types of information, including the context of how, when and by whom they were added.

Figure 4:
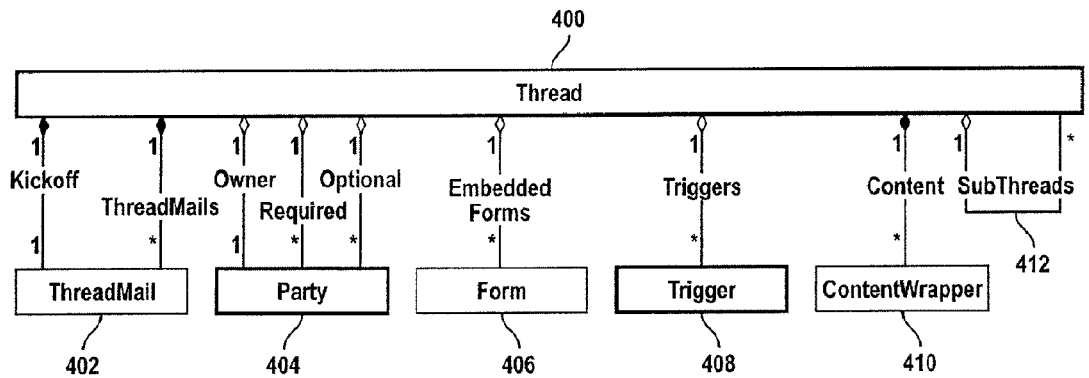
FIG. 4 illustrates an example of a Process Thread in accordance with one embodiment of the present invention.

FIG. 4 illustrates an example of a Process Thread 400 in accordance with one embodiment of the present invention. As shown in the figure, Process Thread 400 is associated with different types of mails, organized under the subtype Thread-Mail 402. These may include a Kickoff Mail that represents the beginning of this particular thread, as well as other ThreadMails that represent other emails connected to this thread. Process Thread 400 is also associated with different parties, which may include a Owner Party, any number of Required Parties, and an Optional Party. These various parties may be organized under the subtype Party 404. Process Thread 400 may also be associated with various forms, triggers, and content, organized under the subtypes Form 406, Trigger 408, and ContentWrapper 410, respectively. The different subtypes shown in FIG. 4 are examples relating to the Process Primitive Object Model implemented discussed in later sections. Also, Process Thread 400 may be associated with various sub-threads 412. As shown in FIG. 4, each association is implemented with an instance of a typed Relation (Relation is discussed in later sections). Also, each diamond shape shows the FromEntity end of the Relation, with solid diamond shapes denoting containment, and hollow diamond shapes denoting sharing.

In this manner, a Process Thread may include user-defined or pre-defined triggers, templates, forms or web services that define or specialize its' behavior and appearance; automatically send notifications or requests for information to people; or invoke other services upon certain events, etc. Process Threads can be reused, recombined, aggregated, analyzed and harvested for best practices. Process Threads may be created, executed, modified and stored by end users via a Process Thread Server, or via domain-specific thread-enabled enterprise applications. A thread-enabled enterprise application either incorporates or is integrated with Thread Services capable of reading and writing Process Thread content in a standardized format, such as a Unified Process Record (UPR). A single Process Thread may be distributed across multiple Process Thread Servers or thread-enabled applications. A Process Thread may include links to other threads or thread content, enabling Process Threads to grow and branch to form a Process Web (described in later sections). End users may browse, update or annotate individual Process Threads or a Process Web via a variety of thread interfaces, including general purpose thread browsers. When accessed through a normal email client, a Process Thread may be delivered as a simple HTML email. Although a thread message may have a familiar appearance with a subject line, message text and attachments, it may also include smart buttons for structured responses—such as approve or decline, delegate a request, acknowledge a message, defer, abstain, etc. Process Threads may automatically collate and summarize such responses to determine, for example, that a specific request was approved based upon the responses of five recipients, notify them that approval was granted, and trigger other messages or actions as a result.

2.1 Process Primitives Object Model

Although collaborative processes in general may be extremely variable in their domain and detail, an arbitrarily close approximation of a given domain-specific process model may be constructed by aggregating different permutations and combinations of a finite set of primitives, referred to here as Process Primitives, according to one embodiment of the invention. The Process Primitives may be reusable, configurable, adaptive and interoperable entity types and services. Process Primitives may be embodied as various types of software language, an object or component framework, other otherwise. In a preferred embodiment of the invention, such entity types are implemented using an object model that can be instantiated and recombined to support the definition and execution a broad range of domain specific process models. There are an arbitrarily large number of alternative embodiments which vary according to the process primitives taxonomy adopted, the uniform services enabled, the mechanisms implemented or languages used, etc.

A Process Primitives model may involve abstraction of collaborative processes in general (as opposed to some specific process domain such as inventory management), and identifying a set of fundamental building blocks that could be recombined and configured in various ways to support the desired range of domain-specific process models. 'Range' in this context refers to the scope of possible process domains covered, the granularity and types of process model variations supported, and the variations in technology infrastructure and application interaction models supported, among others. The result of this decomposition may be a concise taxonomy of domain-neutral object types (in other words, the process primitives) which can be instantiated, combined and/or configured (parametrically or otherwise) to support an arbitrary domain-specific process and application model. Given that the domain-specific aspects of the process or application model are reflected in instantiations or aggregations of the process primitives types, the domain models can be modified or edited dynamically in the same way that production instance data would be modified by a domain specific enterprise application. A realization of the process primitives object model may exist in a persistent form in a uniform record, such as a Uniform Process Record (discussed in later sections), and an executable realization may exist in the corresponding embodiment of the Process Thread Server, in particular in its implementation of Thread Services.

In a preferred embodiment, the Process Primitives incorporate a taxonomy of types. These types are logically abstract super-classes, although they may be implemented in various ways. They may be implemented as conceptual data models represented in .XSD XML scehma files which are reified at execution time into concrete types via C# classes. According to this preferred embodiment, the Process Primitives taxonomy will be concise and disjoint—it will incorporate a relatively small number of Process Primitive types whose functions in general do not overlap. These process primitives incorporate semantics (e.g. properties, attributes, and services) such that they can be instantiated and recombined in various ways so as to support the definition and execution of a range of domain specific process models and a range of functionality.

There may be an arbitrary number of alternative embodiments of this Process Primitives taxonomy. Primitives may be large or fine grained, and their semantics may include the ability to specify rules, define structured data, types of relationships, various types of entities, layout or formatting preferences, etc. etc. The number and types of primitives; and their individual semantics, granularity, and flexibility (the variety of ways the primitives can be sensibly recombined with each other) may determine the range of process domains the model can support, and the closeness of the approximation of any given target process model design that can be supported.

Individual Process Primitives may be process domain neutral. That is, they include general purpose semantics such as the notion of an arbitrary type of person, an arbitrary piece of content, or an arbitrary message. They may also include abstract domain neutral constructs such as a relation or a Process Thread. The Process Primitive types will logically be a hierarchy of types, where subtypes logically inherit its semantics (properties, attributes, and services or their logical equivalents, depending upon the embodiment.) The mechanism for implementing the inheritance will vary depending upon the embodiment, and might include service delegation.

In a preferred embodiment, the semantics of Process Primitives is invoked via a declarative (as opposed to imperative) interface. Generally speaking, a declarative interface explicitly states the intent or objective, without stating the mechanism or sequence of steps to achieve it. By contrast, an imperative interface explicitly states the mechanisms or sequence of steps, without stating explicitly the intent. Further, a declarative interface does not rely upon implicit state information—if state information is necessary to fulfilling the declarative semantic, it is explicitly passed or maintained.

Consistent use of a declarative semantics makes it vastly easier to recombine different Process Primitives in arbitrary ways and still yield an appropriate result. Further, declarative semantics are generally more tolerant of incompleteness. In other words if process semantics aren't available for some reason, the remaining semantics can be executed anyway. As a consequence of these traits, declarative semantics are more easily distributed and may include the storage, execution and definition of the semantics. In cases where imperative semantics or some completeness criteria must be executed or enforced, or where an external system (e.g., an SAP application) has an imperative interface that must be interacted with, they may be encapsulated in a wrapper which can be invoked via a declarative interface.

Figure 5:
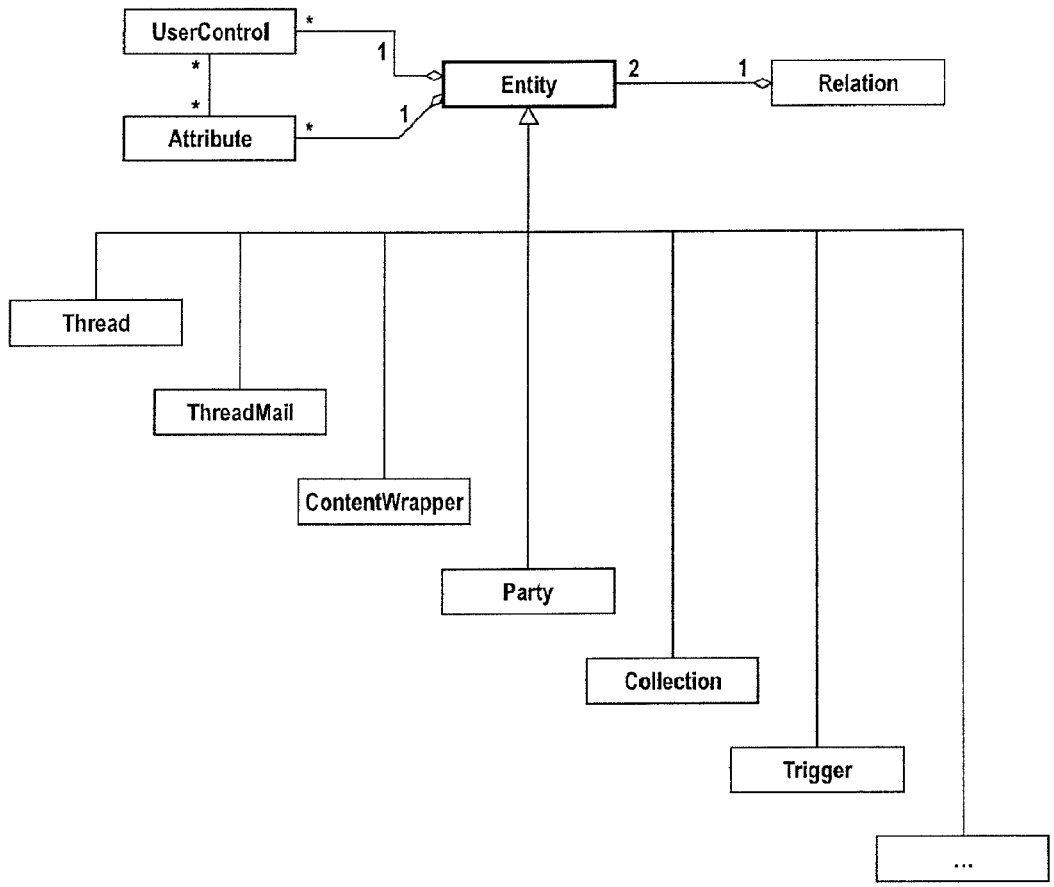
FIG. 5 presents an illustrative arrangement of process primitives in accordance with this embodiment of the invention.

FIG. 5 presents an illustrative arrangement of process primitives in accordance with this embodiment of the invention. Here, the root abstract super type is Entity, and all other types would be subtypes of Entity, and inherit its semantics. These sub-types may include Thread, Relation, Mail, Content Wrapper, Party, Form, Trigger, Wrapper, Collection, Map, etc. The supertype Entity is discussed more detail in the section below. As shown in FIG. 5, a Relation, which is discussed in further detail in later sections, may exist between two Entity objects. An Entity may have any number of Attributes and UserControls. Attributes may be associated with UserControls, a variety of ways. Here, all objects are subtypes of the Base type (not shown) which provides support for persistence and attributes/methods common to all types.

In alternative embodiments the Process Primitives taxonomy hierarchy might be different. For example, Thread, Relation, and Party might logically be peers to Entity, while the remaining types would remain logically subtypes of Entity. In that case, instead of logically inheriting shared semantics (e.g. a Save( ) service which persistently stores the state of an instance of a type), each of the root types would have to implement (perhaps via delegation) their own variation of those semantics. Similarly, in alternative embodiments a given primitive type might be specialized into multiple primitive types. For example, Person might be implemented as a distinct type from Party.

The process semantics of Process Primitives will also in general be infrastructure neutral, meaning that their process semantics will be preserved regardless of the infrastructure they are executed upon. To the extent that specialized infrastructure-specific semantics are necessary (say, how to layout a message in HTML mail, or how to translate a structured response options into their verbal equivalents for a speech interface), they should be disjoint (i.e. orthogonal and independent to the semantics of other primitives) or entirely redundant so that they can be incorporated or ignored when executed on other types of infrastructure without compromising the integrity of the process semantics.

The Process Primitives taxonomy may be extended via aggregating instances of primitive types into aggregate types. Aggregate types are formed by adding Relations between individual Process Primitives. For example, an Approval Thread is made up of a pre-defined collection of Process Primitives including a basic Thread with a set of contained attributes and their associated user interface specifications (i.e. user controls such as Approve, Approve with Changes, Decline, Delegate, Abstain, etc.); a set of Mails and associated Relations (e.g. 'Thread contains Mail of type kick-off'); a set of Triggers and associated Relations.

Also, individual Process Primitives may be logically specialized into sub-types via instance values (property or attribute values) and aggregation. For example, there are various sub-types of Party, including Person, System, Role, Position, Group or Team. The sub-types are specified based upon the value of a property (PartyType), and by adding Relations to other types. For example, a Group might be instantiated as Party (PartyType='Group'), and a Relation to a Collection (CollectionType="Group"), etc.

Having a well-known set of attribute-based sub-types for the Process Primitive taxonomy provides a mechanism for services to reliably specialize their behavior, and for instances of different types to consistently specialize their behaviors when aggregated. Specifically, these standard attribute values can be used as parameters for services to specialize their behaviors, and for an instance of a type to specialize its interface based upon a specific context implied by those attribute values. To the extent that the various elements of the Process Primitives taxonomy incorporates a shared understanding of the attributes for indicating specialized types or behaviors, then Process Primitive instances will be able to self-organize at execution time without extensive special purpose code to orchestrate or coordinate for different contexts or special cases. This is a key mechanism for enabling a wide range of specialization without an explosion of complexity in the core object model and its implementation.

An aggregate type (such as an Approval Thread) might be progressively aggregated with other Process Primitive instances or other aggregate type instances to logically extend the Process Primitives taxonomy into arbitrary domain-specific process model taxonomies. For example, a Process Pack might include a standard Approve Thread, a Content Wrapper (specifically, a placeholder labeled 'Requested Budget') and an associated Relation, and a Party (specifically, of PartyType="Position" and attribute Position="CFO"). This new aggregate type could be labeled "Budget Approval" with a distinct identity, and could be instantiated as a distinct type.

In a preferred embodiment, the Process Primitives taxonomy will incorporate a uniform set of semantics. In particular, all types will share some set of shared properties and services (or their equivalents—e.g. methods in place of services for an object-oriented architecture as opposed to Services Oriented Architecture.) Specific logical types and their logical subtypes will add additional semantics as appropriate, to reflect special semantics that cannot or are not normalized across different types. For example, Party and its logical subtypes might add the property Credentials, which would not be found in other types. An implementation of this hierarchy of uniform semantics will be guaranteed to be made available by software applications that implement the Process Primitives Object Model, This means that the individual services may assume that the attributes and services of the uniform semantics will be available, and therefore they need not implement them themselves, or incorporate exception handlers for cases when they are not implemented. Moreover, the implementation of uniform semantics of individual types can be assumed to understand how to reliably interact with the uniform semantics of other types within the Process Primitives taxonomy.

In addition to the uniform semantics, each type within the Process Primitives will enable the addition of special attributes and services on an ad hoc basis, with the specification and execution of those additional semantics recorded as Process Primitive instances themselves. For example, an instance of Party (Phil Johnson) might add the attribute 'MothersMaidenName'. Or, a new subtype of Party called 'Employee' might be created, and each instance of Employee could include an instance of Relation to specify who an employee's manager is. In such cases, since these extended semantics are implemented as instances of Process Primitives, the relevant uniform services (e.g. Serialize( ) Save( ) Search( ) or Display( ) etc.) will operate on the extended semantics without special case handlers. If extended semantics incorporate external Process Services (which must be registered with the Thread Services' Service Dispatcher), either the external Process Service will have to expose an corresponding implementation of the various uniform semantics and assign them compatible signatures, or special case logic will need to be implemented in instances of Process Primitives to accommodate the absence of the semantics. Otherwise, invocations of an unimplemented semantic will yield a null result which may be misleading. For example, if a special type of Content adapter service is added which stores documents in an external Documentum document management service, but that adapter does not expose a Search( )service, then searches whose scope includes that instance of Content Wrapper will fail to report cases where the document contains the specified search criteria.

In general, the more semantics which are uniform across all types in the Process Primitives taxonomy, the more different ways individual types can be sensibly combined into an aggregate type that exposes a rich and reliable set of semantics. In other words, if the aggregate type 'Budget Approval' is entirely composed of types that implement a Search( ) service (which searches all contained properties and attributes for some specified string or value,) then Search( ) can be invoked upon instances of 'Budget Approval' without requiring knowledge of the composition of 'Budget Approval'. Similarly, if the aggregate type 'Budget Approval' is entirely composed of types that expose the property Visibility and implement a service DisplaySummary( ) which evaluates the property Visibility to determine whether or not a given user is authorized to see an instance, then the DisplaySummary( ) service could be reliably invoked on the instances of the aggregate type without knowledge of its composition.

In a preferred embodiment, the Process Primitives taxonomy will be biased towards implementing semantics higher in the hierarchy, to the extent that those semantics might be necessary in multiple subtypes in certain special cases, or might become necessary in later versions of the application. For example, it might be preferable to implement the property Credentials in Entity rather than Party, to the extent that entities other than Parties might need to record or assert their credentials to other entities. For example, a Form or Content Wrapper instance (say containing a document) might need to show its credentials before it is accepted.

Supporting uniform semantics across the Process Primitives can be achieved in two ways. First, by implementing properties and services (or their equivalents) in abstract super-types, and ensuring that these implementations can handle any specialization required by their subtypes. And second, by implementing semantically equivalent properties and services with compatible signatures across multiple types. For example, if Thread, Party and Relation were all peers rather than logical subtypes of Entity, they could all implement Serialize( ) separately. As long as the implementations were semantically equivalent or comparable and the signatures were compatible, it would present a uniform service interface. Note that one approach for enabling semantically equivalent implementations across multiple types is to have each of them delegate a particular service to a shared Service Provider.

In a preferred embodiment, the Process Primitives taxonomy will in general use the same types for the process domain model, the application model and the distribution model. Similarly, it will use the same types for recording definition, configuration, instance data for each type of model, and for logging their execution history and interrelationships. For example, logging the fact that a particular person opened a document could be implemented by creating an instance of a Relation which records the ID for the instance of Content Wrapper that contains the document, the ID for the person, the date and time the person opened the document, and a RelationType equal to 'Party has Opened'. As another example, an Approval Thread aggregate type could serve to record the execution of a single instance of an Approval Thread, but could also be a reusable Thread Template. A Thread Template is essentially an Approval Thread with additional Relationships pre-defined and additional attributes pre-populated.

This unification of the representation of models makes it dramatically easier to, among other things, implement the Uniform Process Record; to support incremental and ad hoc definition of process definitions by end users; to support diverse, continuously changing process definitions while maintaining a comprehensive audit trails and analysis capabilities; to support infrastructure and distribution transparency; and to create a comprehensive audit trail of the history of the process and its execution.

A concise, disjoint, declarative, extensible Process Primitives taxonomy with a bias towards uniform semantics enables the support a broader range of domain specific process models without an explosion of implementation complexity.

Many alternative embodiments are possible. In a possible embodiment, the Process Primitives taxonomy would include the following:

2.1.1 Entities

Figure 6:
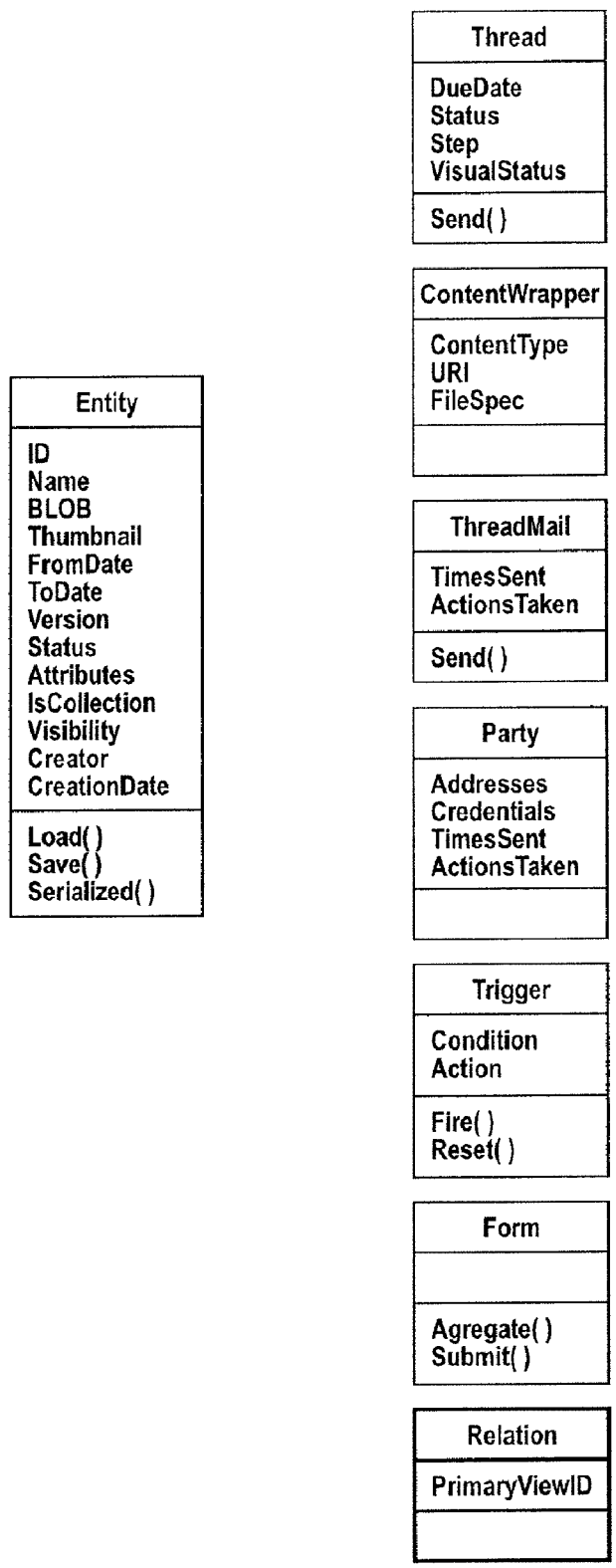
FIG. 6 presents a root abstract type "Entity" and associated major subtypes, in accordance with one embodiment of the present invention.

FIG. 6 presents a root abstract type "Entity" and associated major subtypes, in accordance with one embodiment of the present invention. As mentioned previously, Entity is the root abstract super type used in the Process Primitives taxonomy. The sub-types related to Entity may include Thread, Relation, Mail, Content Wrapper, Party, Form, Trigger, Wrapper, Collection, Map, etc. The specific names of these types are effectively arbitrary, although sensible naming conventions are important for developer productivity. Some common properties of Entity objects may include:

ID—Every Entity has Identity. Preferred implementation: Global unique ID.
    Name—Displayable name (get/set)
    Blob—Displayable rendition of entity [sort of] (get/set)
    Thumbnail—Small displayable rendition (get/set)
    Visibility attributes
    Version Number
    CurrentStore
    ReplicationService
    FromDate
    ToDate
    Status
    Attributes
    IsCollection
    Creator
    CreationDate
    CreatedInView
    Entity Services may include:
        Actions—a set of predefined or user-defined actions that can be applied to an entity (example: approve, decline). Each action is associated with a set of user experience elements (icons, images, text) as well as a message to an Thread Interface Component (via URI).
        Activities—supports fine-grained logging of all changes to an entity
        Attribute, List, Slot, Page—Services used to define forms and UI elements
        Result—completion state for an entity
        Security—allows control over who can see/affect entities
        Signal—provides visual cue as to current status (coarser grained)

Status—Provides summary info about the current state of an entity

Template—Enables creation of a thread with a (perhaps partially) predefined set of parties, roles, content Version—Manages entity versioning Entity services may be applied to any entity, regardless of type. Common behaviors include:
- a Load( )
- Store( )
- Serialize( )
- Authorize( )
- Authenticate( )
- Encrypt( )
- Lock( )
- VerifyUnchanged( )
- SendInMail( )
- CreateThreadWith( )
- CopyAs( )
- Browse( )
- DisplayDetail( )
- DisplayLine( )
- DisplaySignal( )
- SetStatus( )
- FindRelated(scope, as of)
- Archive( )
- Search(scope,criteria)
- CreateNewBranch( )
- Copy(shallow/deep)
- LoadAsOf(date,branch,version)
- Etc.

According to the present embodiment, main types of Entity objects may include: Thread, Process Mail, Content Wrapper, Party, Trigger, Form, Process Map, Process View, Service Wrapper, and Collection.

2.1.1.1 Thread Entities

A Thread entity is an instance of a business process occurrence. It may capture all information associated with that occurrence:
- When it started
- When it is due
- Completion status and date
- Who took part?
- What was the result?
- What actions were taken by which participants (and when)
- What information (content) was used in the process?
- What associated processes (or subsidiary steps) took place?
- What forms were filled out?
- What mail was sent?
- What rules (triggers) were in effect, and what actions were triggered.

The Thread may provide a complete record of what happened/is happening in the process. In addition to the common Entity properties and behaviors, Thread entities can support properties including:
- Start date/Time
- Due date/Time
- Result
- Visual Status (Signal)
- HomePageStyle
- Etc.

In addition to the common Entity services, Thread entities can support the following additional services and behaviors:
- Show.View(HomePage/Setup/Visual Status/OneLine-Summary; date/version)
- ListItems(All/ByPerson/ByMessage; date/version)
- EditSetup( )
- Add(message/step/attachment/participant/form/trigger)
- SendMessage(kickoff, summary, completion, cancellation, etc.)\
- Etc.

When a thread is created, the following entities and relationships may be recorded:
- The thread entity itself
- thread id
- start, due date
- type of thread (e.g., approval, review, etc.)
- thread visibility and security
- thread name
- if the thread is a step in another thread, the step number . . .
- Relationship to each participant
- Owner, Required or optional
- Participant record can be created on the fly (by specifying address)
- Content wrappers for each attachment
- Containment relation added from thread to wrapper
- Process mail (kickoff message) is created
- Relationships added between thread and mail entities
- Participants added as recipients of mail
- Containment relation from the parent thread (if any) to the new thread
- Participants in new thread added as participants in parent
- Form handling
- For each trigger created directly or indirectly by the user
- Relation between thread and trigger In a very simple form, a thread may consists of:
- a set of participants
- kickoff mail message sent to all participants
- a due date
- a completion state
- a result
- a set of possible actions or steps to be taken by participants
- a set of related entities
- a set of configuration parameters stored as attributes of the thread 2.1.1.2 Thread Mail Entities A Thread Mail entity models and records an electronic mail message. In addition to the common Entity properties, Common Mail properties may include:
- Action taken (Approve, Decline, Abstain, Remind me Later, Delegate, etc.)
- Times sent
- Etc.

In addition to the common Entity Services, Common Mail services may include:
- Show.History( )
- Show.Conversation( )
- Show.Recipients( )
- Opened( )
- Responded( )
- Send( )
- Resend( )
- Reply( )
- ReplyAll( )
- Forward( )
- Etc.

Relations may be created from this mail entity
- To the sender
- To each recipient
- To each content wrapper wrapping an attachment
- To each contained Thread
- To each Trigger dependent on this entity 2.1.1.3 Content Wrapper Entities A Content Wrapper entity models a piece of process content. In addition to the common Entity properties, Content Wrapper properties may include:
Content type (MIME type, etc)
URI
File spec
Title
Comment
In addition to the common Entity services, Content Wrapper services may include:
Capture( )
CaptureUpdate( )
CreateThumbnail( )
Watermark(key,visible/invisible)
Show.History( )
Update( )

2.1.1.4 Party Entities

A Party models an addressable entity. A Party may represent a person, a computer program, an organization, or any combination of the foregoing. A Party may own or view Content, participate in threads, send and receive mail, etc. In addition to the common Entity properties, Party properties include:
Credentials (password, etc)
Name
Type of Party (Person, Program, Organization, Role, Group, Team, Position etc)
Address information (email, etc)
Description information
Etc.
In addition to the common Entity services, Party services include:
EditProfile( )
Assign( )

Figure 7:
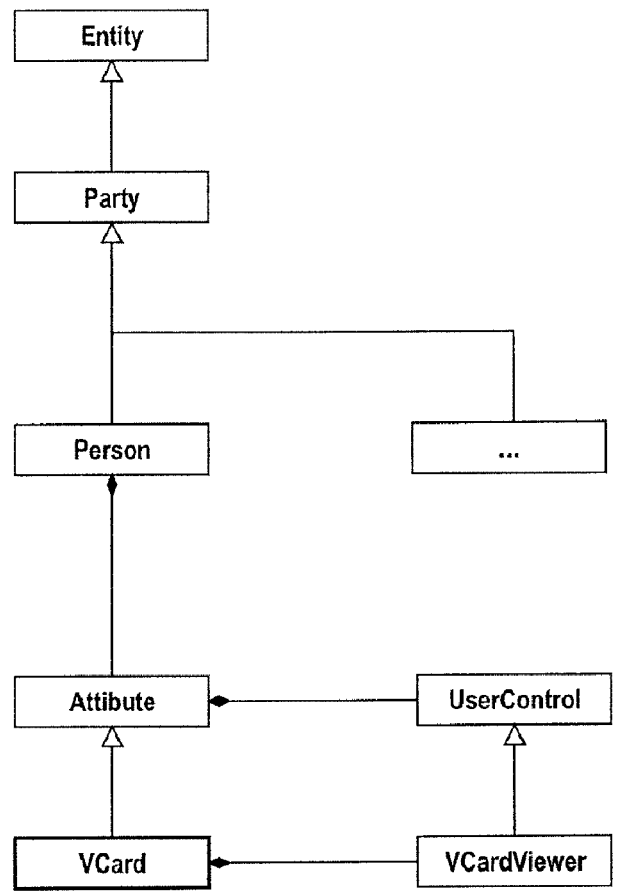
FIG. 7 illustrates a "Person" as a particular type of the sub type "Party," in accordance with one embodiment of the present invention.
Figure 8:
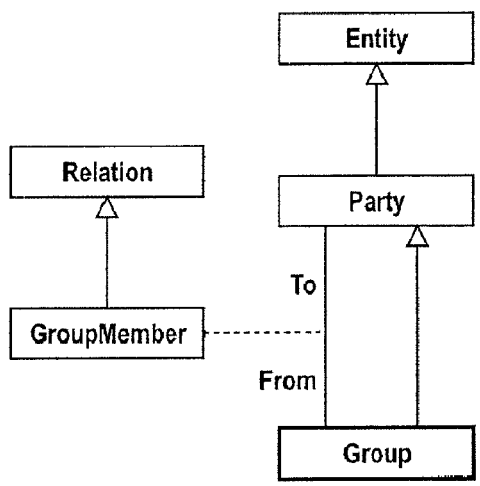
FIG. 8 illustrates a "Group" as a particular type of the sub type "Party," in accordance with one embodiment of the present invention.

FIG. 7 illustrates a "Person" as a particular type of the sub type "Party," in accordance with one embodiment of the present invention. Here, a Person is a type of Party. As shown, a Person has a VCard attribute, which is displayable using a VCardViewer UserControl. FIG. 8 illustrates a "Group" as a particular type of the sub type "Party," in accordance with one embodiment of the present invention. Here, a Group is a type of Party. A GroupMember is a type of Relation from Group to Party. As shown, there is a GroupMember relation from the group to each of the Party's that are members of the Group.

2.1.1.5 Trigger Entities

Triggers enable the system to perform specified actions when a given condition is satisfied. Examples include:
If a recipient of a mail item has not opened within 3 days of delivery, send them a reminder notice.
When a thread comes due, notify the owner of completion status
If a thread result is final, notify the owner even if not due
Start this thread on Jan. 2, 2005
Start this step if the previous one has completed Triggers are typically persistent entities, and may be related to other entities such as mail, threads, or content. Conditions are given in the form of expressions. An expression may be simple, or a boolean combination of expressions. Examples of some simple expressions are listed below, with X and Y denoting entities or members:
(X.DueDate <today)
X.Signal==AllGreen
X.HasOpened(Y)==true

2.1.1.6 Form Entities

Form entities represent structured content and behavior—the typical embodiment of a form entity would include the presentation of a standard HTML form. An HTML form is a section of a document containing normal content, markup, special elements called controls (checkboxes, radio buttons, menus, etc.), and labels on those controls. Users generally "complete" a form by modifying its controls (entering text, selecting menu items, etc.), before submitting the form to an agent for processing (e.g., to a Web server, to a mail server, etc.). In one embodiment, forms are created through a Form Designer, and stored as new entity types. Users can then either add the form to a new or existing thread, or create a new thread using the form as a prototype. Forms controls can include well-known HTML controls, such as: Checkbox, Label, Radio Button List, Drop Down List, Text Box, Rich Text Area, HyperLink, Button. New Form controls can also be created and added dynamically.

In addition to the common Entity services, Form services may include:
Aggregate( )
Collate( )
Submit( )
Combine( )

2.1.1.7 Process Map Entities

A Process Map entity defines a workflow overlay made up of attributes and relations that define a directed graph of nodes. Any node on this graph may be related to other Process Maps, Process Threads, Thread Mails, Parties, Triggers and other types of entities. A Process Map defines an address space, so that nodes of the Process Map or their related entities (or collections of entities) may be referred to unambiguously relative to the Process Map. A Process Map entity will expose an address service that resolves an relative address (i.e.ProcessMapID/NodeNumber/RelativeEntityIdentifier) into that Entities globally unique ID.

Triggers or Process Services may be related to a Process Map and used to initiate conditional actions upon certain events or conditions occurring. This supports arbitrary work flow logic to be incorporated in a Process Map. The semantics of a Process Map may be translated into standard workflow definition and business process management orchestration standards, and vice versa.

2.1.1.8 Process View Entities

A Process View is an entity that defines a subset of an overall Process Web. Process Views may have other Entities added explicitly as members via Relations of type 'Process View Contains Entity'. Every Relation may optionally record the Process Views that was active when the Relation was created. The active Process View can be set explicitly by a Trigger or Thread Template, or maintained as part of the user session state. A Process View may be used to filter the Relations that are used to generate navigational views of a Process Web by walking Relations from a particular Entity. This enables a hierarchical view to be generated when an Entity has multiple parents in different Process Views.

2.1.1.9 Service Wrapper Entities

A Service Wrapper Entity represents information used to make a particular service call. This might include endpoint information, credentials, parameters, as well as visual elements. An entity which uses a service may create a service wrapper for that service, as well as a relation of type "uses" (possibly sutyped) between the calling entity and the service wrapper.

2.1.1.10 Collection Entities

A Collection entity represents a set of other Entities. This may be implemented as a set of "contains" Relations from the Collection to each Entity in the Collection. There may be several subtypes of the "contains" relation to distinguish various types of collections.

2.1.2 Relations

A Relation may be defined between two entities. A Relation may itself be an entity with the following common properties:

ID (preferred embodiment: global unique ID)
From entity
To Entity
Relation type
Created on Date/Time
Created by Party
Created in context of Process View (PrimaryView)

In a preferred embodiment, there will be a well known set of Relation types which can be distinguished by attribute values on the Relation. Possible common Relation types are as follows:

Form contains Form
Thread contains Thread
Thread contains Mail
Thread contains Content Wrapper
Mail contains Content Wrapper as an attachment
Mail contains Form as an attachment
Thread contains Form
Content Wrapper contains Form
Content Wrapper contains Content Wrapper
Mail created in the context of another Mail
Mail contains Task as an attachment
Mail contains Mail as an attachment
Content Wrapper contains Thread
Content Wrapper contains Mail
Thread contains a reference to another Thread
Thread delegated from another Thread
Entity Placed in the Scope of another Entity
Containers contain other items
Favorites contain a list of item
Recent items contain a list of items
Mail is Forward of Mail
Mail is Reply to Mail
Thread has Result that Applies to Entity [Result is value/reference]
User Control has Result that Applies to Entity
Thread is Copy based on Thread with same (participants, attachments, kick-off text, triggers, steps)
Mail is Copy based on Mail with same (recipients, attachments, text, triggers)
Content Wrapper is Copy based on Content Wrapper[As Placeholder] with same (Title; Comments; inner contents; Security, Relations, Triggers)
Entity is Managed by Party
Entity uses Service (URI) [For Service.Type]
Party is a (required/optional) Participant in a Thread with (admin/oversight/member/view-only)Privileges
Party is a Recipient of (to, cc, bcc) a Mail with (view-only/view and share/restricted)Privileges
Party is a Sender of a Mail
Party has Attached Entity to an Entity
Party has Opened Entity [accessed from Entity]
Party has Subscribed to Entity for Notification (types of notifications/means of notification)
Party has Clicked a User Control
Party has Delegated (delegation scope parameters) to Party
Party can Fulfill Party.Role
Party can Occupy Party.Position

2.2 Unified Process Record (UPR)

According to one embodiment of the present invention, a persistent data form of Process Threads, referred to here as a Unified Process Record, could be used to support various types of general purpose process applications (i.e. Process Thread Servers) or arbitrary domain-specific applications. Thus, the Unified Process Record may be stored in a storage medium, unless it is removed therefrom. The Unified Process Record combines the process model definition data, process instance data, and the process model configuration specification in a unified data model. In addition to the process information itself, the Unified Process Record may also include a similar unified representation of the application model definition data, application model configuration specification and application instance data. These provide for the information relating to the execution of the process model, including user, content and service administration and preferences; the technology infrastructure requirements, preferences and distribution topologies; and a log of the relationships between instances of the process model and the application model. Both the process model and application model and their instances may be different aspects of a single unified and integrated model, and may share common process primitives.

The semantics of the Unified Process Record are expressed in a form which can be translated dynamically (reified) into executable instances of a process primitives object model. These semantics may be translated into various alternate forms specific to alternate persistent storages services, which might include relational or other databases, persistent object filing systems, XML files or other markup languages, structured text files, a formatted document file, or a specialized binary file formats. The information in the Unified Process Record may be dynamically translated into application behaviors (generating an interactive user interface, enforcing rules, storing data, sending messages, etc.) by an appropriately enabled application such as a Process Thread Server. Similarly, as participants interact with the application in order to browse, annotate or update the process, a record of their activity may be captured and translated so as to update the Unified Process Record.

Storage of Unified Process Record content may be distributed, and may rely upon diverse persistence services. In cases where the Unified Process Record content for a single user session is distributed across multiple stores, the Unified Process Record may be aggregated as data to a centralized server for reification, or may be reified by local servers for each data store with the resulting objects being accessed via a remote object access protocol such as SOAP (Simple Object Access Protocol), or both.

2.3 Thread Services

A Thread-enabled application such as a Process Thread Server may include or invoke a set of services, referred to here as Thread Services. Thread Services provide an execution environment for process primitives, and mediates between the Unified Process Record, the Thread Interface Components and Process Services. Depending upon their embodiment, Thread Services may provide for infrastructure transparency (the ability to execute Process Threads upon various underlying software infrastructure,) location transparency (the ability to distribute execution), and cross-platform interoperability (the ability to interoperate or invoke Process Threads or services hosted on different software infrastructure). Thread Services may include:

Process Primitives Object Model: This is a concrete implementation of the types (or other modeling or language mechanisms) that make up the process primitives taxonomy.

Unified Process Record Data Model: This dynamically translates (reifies) persistent data in the Unified Process Record into executable (and possibly remote-able) instances of the Process Primitive Object Model. Conversely, it is able to dynamically translate executable instances of the Process Primitives into persistent data in the Unified Process Record.

Thread Execution Services: These may include an executive, event bus, queue manager, channel managers, request handlers, HTTP, SMTP, POP3, SOAP, authentication, caching, among others.

Service Dispatcher: This decouples the mechanisms for invoking a service from its provisioning and implementation details. It publishes a base set of well known services used internally by the Process Thread Server or thread-enabled application, including the services associated with the Process Primitives Object Model. Additional services can be dynamically registered with the dispatcher.

Thread Identity Service: This assigns identifiers (which in a preferred embodiment are globally unique IDs) to new instances of the process primitives object model.

Thread Directory/Address Service: This may resolve a thread identifier into one or more (assuming replication) URIs (Universal Resource Identifiers) which can provision the associated resource, and enable administration and management of such resources.

2.4 Thread Interface Components

According to one embodiment of the invention, a variety of end-user or application interfaces, referred to here as Thread Interface Components, may enable people or software programs to view, update, annotate, search, filter, transform, aggregate, analyze or navigate Process Thread content, or other data stored in a Unified Process Record format. Thread Interface Components may call other Thread Interface Components; services provided by their execution environment; or Process Services or the Process Primitive Object Model instances mediated by the Thread Services. In a preferred embodiment, Thread Interface Components may be remote-able, and user-facing Thread Interface Components may be invoked as a user-facing remote-able web service and may be addressed via a URI.

Client-specific implementations of Thread Interface Components may be implemented, enabling users or software to interact with the same Process Threads via a variety of different client technologies or interfaces. These may include components to support user access via existing and unmodified clients such as web browser, HTML mail, RSS Readers, text messaging devices. Alternatively, Thread Interface Components could be deployed as a thread-enabled client application, an email client add-in (such as an Outlook COM add-in), or as a browser toolbar add-in.

Similarly, there may be Thread Interface Components to support a variety of different programmatic interfaces, including various web service, XML, EAI products or standards. In addition, there may be specialized Thread Interface Components for particular enterprise applications packages such as SAP, for document management systems, database schema, etc.

In one embodiment, Thread Interface Components may include the following:
- URI-addressable ASP.Net pages containing HTML, client and server-side script, embedded user and custom controls and .Net CLR (common language runtime) objects.
- Web services (XML/SOAP over HTTP and other transports)
- Worker objects dispatched from Mail and Queue request handlers.

Thread Interface Components may either be general purpose, domain-specific or customized. A general purpose thread application such as a Process Thread Server may incorporate a variety of different types of domain neutral Thread Interface Components that enable end users to define, execute, search, annotate, analyze, browse and reuse arbitrary Process Threads and their content. These might include the following:

2.4.1 Thread Mails:

According to one embodiment of the invention, a variety of standard email templates, referred to here as Thread Mails, may be used to generate HTML or text messages related to Process Threads. These include a regular email message, a kick-off message, and various notifications including completion, update, reminder, late, escalation, delegation, etc. In the preferred embodiment, each of these includes a set of standard controls which are images or links with an embedded URL/URI. In the preferred embodiment this URI incorporates a globally unique string which serves as a URL, and as a code which can be parsed to establish the context of the user interaction. The URI is specific to the individual message, the individual recipient, and the individual control or link, and the appropriate Thread Interface Component that should be invoked should the user click the button or link. Each Thread Mail incorporates a highly filtered and specific view into a Process Thread—such as a notification that an approval has been completed with a result of approved. In that case, the completion notice might include a list of the participants, a summary of their responses (including an link which summarizes each individual response) and standard Reply, Reply All, Forward controls, and a Browse Threads control. If the user were to click on any of these controls or links, the embedded URI would open a browser session with the appropriate Thread Interface Control (e.g. Compose Email), which would parse the URI to establish and log the appropriate context—e.g., indicating that Joe Smith clicked the "Approve" button on the kick-off message from a specific approval thread.

2.4.2 Thread Browser:

According to one embodiment of the invention, a user interface referred to here as a Thread Browsers enables users to navigate among and interact with related Process Thread content in a Process Web. Alternative layouts and features are possible for a Thread Browser, but a typical version would be displayed in a web page divided into panels—A Toolbar, Select Thread Pane, Select Item Pane, and Reading Pane.

The Thread Browsers lets users navigate among and select individual Process Threads, people, messages, attachments, etc. for browsing. Browsing some item (thread, person, message, etc.) updates the Thread Browser page to show a filtered view of the Process Web from the perspective of that particular item. Specifically, it may show a Viewer appropriate to the selected item (a Thread Homepage, Content Viewer, Person Viewer, etc.), and update the Select Thread and Select Item Panes to show other items that related to the item being browsed. For example, if a specific Process Thread is browsed, the Reading Pane would show its Thread Homepage, the Select Thread Pane would show a tree (hierarchical view) of the Process Thread's parents and children, and the Select Item Pane would show tabs with the messages, people, attachments and other threads that are directly related to the Process Thread being viewed.

If an Attachment (say a contract) is browsed, the Reading Pane would display its' Content Viewer, the Select Item Pane would show tabs with the messages that include the Attachment (regardless of which Process Threads the message was created in); the people that interacted with the Attachment (opened it, attached it, sent or received messages that included it, etc.); all of the Process Threads that include the Attachment; and a list of all related Attachments (Placeholders, prior or subsequent versions of the Attachment, etc.) The Content Viewer might also let the user call up different views, such as and administrative view for the Attachment (access privileges, etc.) the history of the Attachment (who interacted with it, where it came from, etc.), content management capabilities, collaborative editing capabilities, etc.

Selecting an item in the Select Items Pane would open the appropriate Viewer for that item in the Reading Pane, but would not pivot the view in the Thread Browser unless the user clicks the 'Browse This' button in the items Viewer. The Thread Browser Toolbar enables the user to add new process content (Process Threads, messages, or Process Packs); or navigate to other views such as a list of recent threads or items viewed by the user, the user's in-box and personal summaries of in-progress or completed activities, the user's in-complete drafts of new messages, etc. It also includes the ability for the user to Search the Process Thread or Process Web.

2.4.3 Thread Homepage Viewer:

According to one embodiment of the invention, a Thread Homepage Viewer presents a concise, updateable summary view and navigation center for a single Process Thread. Alternative Thread Homepage viewers may be applied to the same Process Thread, presenting a different layout or UI style and/or different summary information and navigational options and controls.

In one embodiment, the top of a Thread Homepage Viewer will display a brief description—e.g. thread name (e.g. 'Q3 budget estimates'), sent/due dates, thread template type (e.g. Budget Approval), sender name and organization. It may show the thread's current result ('Approved with Changes'), status ('Complete', 'on-time') and a coded signal (green light) which is derived from the current state, result and status of the thread, based upon configurable or template specific criteria.

A Thread Homepage Viewer may include a Participant Response section with summaries of the thread's participants and their responses ('Approved', 'Abstained', 'Delegated' etc.), as well as the messages and attachments related to the thread. Each of these will includes links that enable the user to drill-down and view the underlying detailed content summarized in the home page.

A Thread Homepage Viewer may allow users to navigate to various views of the history and status of the thread, to send new messages or responses, attach additional content or triggers, navigate to or edit embedded steps (which can themselves be threads). Forms or user facing web services may be incorporated in the thread's template and displayed in the home page.

2.4.4 Content Viewer:

According to one embodiment of the invention, a Content Viewer allows user to view, update or act upon one or more pieces of information content contained in a Content Wrapper. It can display a single piece of content (i.e. a file) or a Placeholder which is a named, securable, annotated container that can include multiple different items of content, each in their own Content Wrapper.

Content Viewers have specialized handlers or adapters for different types of content, including files (spreadsheet, word processing, images, scanned documents or faxes, etc.), captured web pages; user-facing web services; Placeholders; etc. Whatever the type of content is, the Content Viewer displays an interactive view so the user can directly interact with it in its' native application environment (Excel, Word, TIFF image viewer, etc.) or simply view a captured image of the content if a live application session is not possible or allowed.

Content Viewers provide navigational options (view the content's version history, view the log of user interactions with it, administrative and security panels, etc.), as well as controls to open the document in a separate window for editing, save a revised version, include it in an existing or new Process Thread or message, etc. A Content Viewer may also includes a 'Browse This' button which will either pivot or open a Thread Browser to display a filtered view of the Process Web organized from the perspective of the individual piece of Content.

2.4.5 Message Viewer:

According to one embodiment of the invention, a Message Viewer displays the message itself, from/to/subject lines, including the structured responses (approve, delegate, abstain, etc.) and links to Attachments if any. It may also include:

A summary indicating the status of individual recipient's responses—including whether they had opened or replied to the message and when, with quick links that summarize structured responses and let the user view the actual response message.

Controls to forward, reply, reply all, or resend the message.

Navigational links to pages to let the user set up triggers or alerts to automatically remind recipients or forward response based upon specific criteria; see a conversational thread history view of the message (graphically representing the flow of messages and responses); view an administrative and security options; and to browse the message.

2.4.6 Party Viewer:

According to one embodiment of the invention, a Party Viewer enables the user to view, update or add information about a Party, and navigate to related information about that Party's history or activities. A Party may be a person, a role, a position, a group or a team—any individual or group with a distinct identity that may participate in Process Threads, and may have privileges or preferences that need to be expressed or enforced.

A Party Viewer displays information about a person, role, group or position, summarizes their past activities via Process Threads, and allows authorized users to view or update administrative, notification and security privileges and preferences.

The display and navigation options will vary according to the type of party being viewed (i.e. a person or a group.) Over time the profile for each Party will grow to reflect their activities and the information they have added about themselves, or others have added about them, or information inferred their activities or aggregated from other sources.

One or more authorized administrators (typically the person who is the participant or who occupies a role or position) will be able to control who can see or share what information about a Party that they have added, or that others have added about them. They may establish Filter Profiles that shows different information about the Party to different users—anything from full navigational and update access to the profile and the person's history to an anonymous alias which hides their true contact information and identity.

The Party Viewer may show biographical information such as including contact information, roles, positions or organizational affiliations, educational background or certifications, etc. It will be able to show the history of the changes to such biographical information over time, so as to reconstruct the profile of a party at any given time. For Parties which are collections of other Parties (i.e. individual people or smaller groups) the Party Viewer will show a summary of the members of the Party, and enable the user to drill down to see detail about the individual members.

The Party Viewer will be able to display summaries and provide navigation paths and search or filtering which will show the history of the person's interactions via Process Threads. For example, it may show messages sent or received by that Party, Process Threads they created or participated in, content they added or viewed, outstanding deliverables, etc. Such related items may be accessed via either indexes, trees, or search interfaces. The items displayed may be filtered based up dates, types of activities or content, or other criteria. Users may hyperlink to and/or browse any item viewed in the Party Viewer.

2.4.7 Compose Message:

According to one embodiment of the invention, a Compose Message Editor allows a user to compose a message; specify recipients; specify a structured response string (e.g. Approve, Abstain, Delegate, etc.) for the message subject; attach content; include structured response options (i.e. buttons) for the recipients; specify security or delivery options; override which Process Thread to include the message in by default; etc.

2.4.8 Thread Editor:

According to one embodiment of the invention, a Thread Editor allows a user to configure a new ad hoc Process Thread; to modify the setup of a Process Thread that is in process; to modify a copy of a previous Process Thread; or to set up a Process Thread template from a Process Pack. A Thread Template either pre-populates or hard-codes the setup specification for a Process Thread. Thread Templates may be a built-in standard thread type (Approve, Review, Request Document, etc.), an existing ad hoc Process Thread which was copied and modified, or a re-usable template from a Process Pack. The setup specification of a Process Thread may include:

relationships to other Process Threads of various types (e.g. child of in Thread Tree, etc.);
  a kick-off message;
  a due date and/or a end date;
  a set of participants;
  specification of structured response options (e.g. Approve, Abstain, Delegate, etc.);
  a set of forms, information content or user-facing web services to be displayed by default in the Thread Homepage;
  a set of Attachments (including Placeholders);
  a set of Steps, which themselves may be fully or partially specified Process Threads;
  specification of security preferences including authentication requirements and authorization rules for which Parties are able to see, view, modify, or share (forward or attach) the Process Thread, or specification of a Lockbox managed by some other Party which may enforce security preferences;
  specification of delivery options;
  presentation options, including layout or style of Thread Homepage, style or layout of messages, how and whether it is visible in various navigational views, etc.;
  specification of configuration options for the Thread Template (quorum of responses for completion; rules or algorithm for displaying the status or result of the Process Thread, etc.; how to handle incomplete or conflicting response; etc.)
  a set of Triggers or Alerts which may send notifications of certain events (completion, update, reminder, late notice, escalation message, etc.), activate Steps or other Process Threads, etc.

2.4.9 Thread Organizers:

According to one embodiment of the invention, Thread Organizers enable users to browse and navigate Process Thread Content relating to a one or more Parties (including people, groups, organizations, etc.) or collections of Process Threads, with an emphasis on highlighting important or timely information, and providing a variety of configurable views. Views can be generated by search criteria, categories, or favorites. Upon selecting an item via an organizer view, the user may view or browse it.

2.4.10 Structured Thread Search:

According to one embodiment of the invention, a Structured Thread Search enables a user to specify structured search criteria. Such criteria might include the type of process content, text, date ranges, specific attribute values, results, status, direct or indirect relationships to Parties, Process Threads or other process content, etc.

2.4.11 Form Editor:

According to one embodiment of the invention, a Form Editor Enables a user to view and edit the definition of structured forms, including content, layout, formatting, user interface style, embedded triggers, coach text and mouse-over help text, etc. Numerous Alternative embodiments are possible, including WSIWG (what you see is what you get) editors. Form editors may support different form capabilities. Form editors may be a third party product, such as Microsoft InfoPath.

2.4.12 Rule or Trigger Editor:

According to one embodiment of the invention, a Rule or Trigger Editor enables users to view, edit or add Triggers or Rules to Process Threads or Process Packs. Supports arbitrary EVA (Event, Condition, Action) style rules and logical operators. Includes ability to use the any events or data visible to or recorded by Process Threads as a rule predicate. May invoke a specified set of actions via the Thread API, which may include anything a human user could do via Thread Interface Components—i.e. send a notification with specified message content upon the completion of a thread, etc. etc. Rule editors may either be unstructured free-form rule editors, or structured rule editors that include a interface template that allows the user to select from predefined configuration options rather than define the rules directly.

2.4.13 Process Pack Designer:

According to one embodiment of the invention, a Process Pack Designer Enables a user to specify, configure and package a Process Pack including a set of Thread Templates, Thread Applications, Process Services, Triggers and custom Thread Interface Components. Process Packs are explained in more detail later. The Process Pack Designer may include Thread Interface Components that enable the user to:

Navigate to, copy and edit existing Process Threads so as to make them reusable Thread Templates, and then name and include them in the Process Pack.
  Support the specification of a collection of items (Thread Templates, Process Services, etc.) that make up the Process Pack, assign labels and identities, and specify rules for when, how and under what circumstances these components will be presented to end users of the Process Pack.
  Include third party development tools such as InfoPath, Visual Studio, etc. to build or integrate Thread Applications, Process Services, etc.

2.4.14 User Interface Orchestration

According to one embodiment of the invention, Process Threads are able to orchestrate a single seamless user session that may span different Thread Interface Components hosted on different systems and utilizing different client technologies over a period of time. The session context is maintained by passing one or more embedded process primitive instance IDs (which may be appended with annotations that indicate the user action taken—e.g. which button the user clicked)

between Thread Interface Components as the user session unfolds. These annotated IDs may serve as URIs to invoke the next Thread Interface Component in the sequence. This Thread Interface Component may in turn use the same annotated IDs as a seed from which it can derive an appropriate object map, instantiating process primitives and other Thread Interface Components based upon an instance-neutral algorithm embedded in the Thread Interface Components, Process Primitive Object Model, and/or encoded in the Uniform Process Record data. In this way, Thread Interface Components may bootstrap and render a self-organizing personalized composite view of the Process Thread appropriate to the user's privileges and preferences, the state and history of the process, the and session context and user action, and the capabilities of the client technology—all derived directly or indirectly from the original set of annotated IDs embedded in a single button. In addition, the user action of clicking the button could be logged in the Unified Process Record, including all of the process primitive IDs and encoded annotations. The Unified Process Record and its corresponding process primitive executable objects provide different Thread Interface Components a shared understanding of the process context and the state of the user session, allowing them to implicitly coordinate even though they do not communicate at all, or only via shared URIs.

For example, a request from a Process Thread may be translated into an HTML mail which provides for specific structured responses (e.g. Approve, Approve with Changes, Decline) via appropriately labeled buttons, each of which was encoded with a composite URI. This URI could include the URL of the Process Thread Server that hosts the thread, a specification of the appropriate Thread Interface Component to handle the response, two globally unique IDs specific to the recipient and the message, and a code to indicate which button the URI is embedded in. If the user were to open the email and click the 'Approve' button, it could invoke a web browser with this URI, and the Process Thread Server could parse it and instantiate the indicated Thread Interface Control with the composite URI. That Thread Interface Control might in turn call additional Thread Interface Controls via URIs which they unambiguously derived by parsing the original URL (This URI derivation could be very involved, and might involve fetching process primitive instances specified by the IDs parsed from the original URI, and then bootstrapping from there based upon the attribute values and relationships of that instance.)

Process Packs or domain-specific applications may also include domain-specific Thread Interface Components that present specialized views, editing interfaces specially adapted to their domain.

2.5 Process Services

According to one embodiment of the present invention, an extensible set of services, referred to here as Process service, may be invoked by each other, by Thread Interface Components, or by instances of the Process Primitives Object Model. Process Services may be registered with the Thread Service's Service Dispatcher, which exposes a uniform services interface that decouples the mechanisms for invoking a service from its provisioning and implementation details. A Process Service Interface Specification may include a signature, a mechanism for defining the capabilities of the service, the semantics of its interface, and information relating to its provisioning and management. According to a preferred embodiment of the invention, this interface specification is expressed in WSDL (Web Services Description Language).

In one embodiment of the invention, a Process Primitive Object Model may include a standard taxonomy of Process Services, and may expose a uniform set of Process Service Interface Specifications via the Service Dispatcher. There may be multiple Service Providers for each Process Service. Different service providers that expose the same Process Service Interface Specification may have different implementations or capabilities, but may be treated as interchangeable from the perspective of how they are used by other elements of the Process Primitive Object Model. For example, an authorization service might publish the following interface signatures:

IsVisibleTo(EntityID, PartyIdentifier, PartyIDType)
MayUpdate(EntityID, PartyIdentifier, PartyIDType)
MayShare(EntityID, PartyIdentifier, PartyIDType)
MayExport(EntityID, PartyIdentifier, PartyIDType)
MayPrint(EntityID, PartyIdentifier, PartyIDType)
Etc.

There might be multiple Service Providers that implement this Process Service Interface Speciation, including one based upon Microsoft Active Directory, another based upon LDAP (Lightweight Directory Access Protocol), a third based upon a proprietary access control system embedded in an SAP application. There might also be several other Native Service Providers that fulfill the specification, including ones that asynchronously (i.e. by sending an email-based message that will require an unpredictable length of time for a response) escalates an ad hoc request for access to the information to a different Party who has administrative privileges, instead of referring to a rule or database. Because each implementation implements the same interface signatures and comparable semantics, they can be used interchangeably, even thought their mechanisms for determining privileges may be completely different.

The standard taxonomy of process services may include among others persistence, triggers, routing, encryption, authorization, authentication, watermarking, non-repudiation, versioning, logging, web capture, content capture, transport, notification, reporting, etc. Generally speaking, relying upon the standard Process Service Interface Specifications where they exist may be preferred, though not necessarily required. Similarly, in a well designed Process Primitives taxonomy, the various types may expose a large number of common methods, which will be delegated to the same or interchangeable Process Services. These design patterns tend to make instances of Process Primitives more recombinant—in other words, an arbitrary aggregation of object instances of disparate types can be treated as if it were a single large object with a consistent services interfaces and behaviors.

A Process Thread Server or Thread Application may implement a set of Native Service Providers, and it may also provide access to External Service Providers which may be provisioned locally or remotely. External Service Providers may natively expose a Process Service Interface Specification that is directly registered with the Service Dispatcher, or it may be contained within a thread-aware Service Wrapper. A Service Wrapper exposes a Process Service Interface Specification and may implement an adapter which translates the native interface and capabilities of the service provider in order to map them into an implementation that conforms to its' Process Service Interface Specification. An example of a Process Service adapter would be an adapter that enabled a Documentum document management application to serve as a persistence service for files. The adapter would expose a Process Service Interface Specification with the same signatures as a Native Service Provider, including:

Load( )
Save( )
Serialize( )

Search( )
SaveAsNewBranch( )
Etc.

The adapter would incorporate code that maps these signatures into the corresponding application programming interfaces (APIs) of the Documentum application, and implement equivalent services or exception handlers for any functionality that may be missing from Documentum. In addition, the adapter may add additional service signatures to the Process Service Interface Specification for APIs exposed by Documentum that are not present in the Native Service Provider, making them available as Enhanced Services.

A Process Thread Server may enable access to a default set of Process Services as necessary to support the execution of instances of the various types in its Process Primitives Object Model. Individual process primitive instances may also specify a particular variation or provider for each Process Service that it invokes, and this specification may be stored in the Unified Process Record. At execution time, the implementation of each service may be dynamically delegated to the specified Service Provider, or may be handled by the default Service Provider of the Process Thread Server or Thread Application.

In some cases and implementations, a single instance of a Process Primitive entity may specify multiple Service Providers to fulfill the same service. The Service Dispatcher may have a mechanism to aggregate different types of services in a coherent way. For example, a Content Wrapper might specify the native local persistence service as the primary storage, and an external remote eRoom document management repository as a secondary storage. If multiple authorization services are specified, the Service Dispatcher might be directed to aggregate their responses (whether or not a participant is privileged to open a content wrapper) so that either all authorizations are required before access is granted. Various options for how to aggregate or discriminate between multiple Service Providers could be provided, and could be specified based upon arbitrary criteria, including for individual process primitive instances, as a personal preference, as an organizational policy, etc. For certain types of Process Services or content, multiple Service Providers are inappropriate, in which case the Service Dispatcher might implement or invoke a precedence service to select which of the multiple Services Providers to invoke.

Process Services may be user-facing web services, in which case they are capable of displaying information or exposing interactive controls directly to the user. Such human interface may be an individual control (say a check box or drop-list), a frame, or an entire page. The Process Service interface may enable its user-facing interface to be configured (UI look and feel, the options provided, the parameters of the window or frame or control allocated, etc.) and enables the Process Service to specify what its requirements or preferences are for a user facing interface based upon a particular context.

A single instance of a Process Service might have both user-facing and an application interfaces. For example, an authorization service attached to a content wrapper in a Process Thread might be able to expose a web frame that allows authorized users to view or update access privilege rules for that Content Wrapper. That same authorization service may also be invoked any time a Thread Interface Component attempts to display the contents of the content wrapper, evaluating whether the user is properly authenticated and authorized. If the Process Thread session has not authenticated the user properly, the authorization service may reply that the user does not have access privileges, or invoke a user facing authentication service and present it to the user. Similarly, if the user is authenticated but does not have the appropriate privileges, the authorization service may simply deny access to the content, or expose a user interface element (a frame or window) that offers the user the opportunity to request privileges. If the user does choose to request privileges, the authorization service may invoke other Process Services to send a request to the administrator for the content, register a trigger to wait for the response, and finally send a thread message to the requestor if and when the administrator responds. A complete log of such a sequence of activities may be attached to the original Process Thread (or related threads), and therefore visible to any other Process Service or process primitive instance that needs to know or be notified of certain types of events or actions.

In this manner, disparate combinations of process model definitions or data, Thread Interface Components and process services may be aggregated on the fly without causing a dramatic increase in implementation complexity. In this case, neither the implementation of the Thread Interface Component that attempts to open the Content Wrapper nor the specification of the Content Wrapper itself would need to understand or accommodate the possible variations in the implementation of the authorization service, even if the authorization service triggered a long-running chain of additional services or user interactions A non-exhaustive list of examples of Process Services is provided below. A serialization service converts between objects and a format suitable for streaming by a transport service. For interoperability, all Thread Servers may natively provide a serialization service. Third party serialization service providers may also be used. Transport services are used to send and receive messages. A Thread Server typically uses a minimum of three transport services: (i) HTTP transport—may be from 3rd party providers such as IIS or Apache, or natively provided, (ii) Queuing service—3rd party provider include MSMQ, MQ Series, JMS, etc., and (iii) Mail transports—3rd party providers include POP3, IMAP, etc. As it is the case here, various services may have differing interfaces. In a preferred embodiment of the invention, all communication to external systems should be through the Transport interfaces. Storage services are used to read and write data to a durable medium. In particular, the UPR Data Model uses one or more Storage service to read and persist the elements of the UPR. Storage services, like all services, may be remote or local. A reporting service may also be used. Here, a 3rd party reporting tool is typically the service provider. Also a version service may allow various content to be versions. For example, Mail, Threads and thread sub-types (forms, etc) may be versioned. An archive service allows content to be archived. Using an archive service, any coherent portion of the UPR may be archived/restored by an archival process. Encryption services may be supplied by several providers. In a preferred embodiment of the invention, standard providers of encryption services are used to promote interoperability, supporting symmetric, asymmetric and one-way hash algorithms. Security services may also be used, and may be split into separate authentication and authorization services. In one embodiment of the invention, a security service may make use of a Directory service supporting LDAP (Lightweight Directory Access Protocol). A replication service may be used to coordinating one or more storage services and transports, in order to replicate all or part of the UPR to remote storage sites. A search service may also be used. In a preferred embodiment of the invention, full-text search and other search capabilities are provided against the UPR. This typically involves using indexing and search capabilities of the storage provider. Directory services may be used to provide access to LDAP or other directories. A content capture service may also be used for web capture, file capture and email capture. Native or standard 3rd party providers may supply such capture services. Transaction management services may be used to support local and global (XA) transactions. (The X/Open Distributed Transaction Processing XA standard defines the application programming interfaces that a resource manager uses to communicate with a transaction manager. The XA interfaces enable resource managers to join transactions, to perform two-phase commit, and to recover in-doubt transactions following a failure. X/Open is a vendor consortium. Workflow services may be used to enable coordination with external workflow providers. Forms services enable extension of the system to work with external forms systems such as Microsoft's InfoPath or W3C's XForms.

2.5.1 Exception Handlers

Enabling ad hoc, incremental definition of processes by distributed end users will inevitably mean that exceptions that require a user or system response will occur as the processes unfold. Typical examples might include:

- Exceptions where the person or template that defined a Process Thread did not (purposefully or otherwise) define a rule to handle a possible future event (i.e. an attempt by a particular person to open a document), or specified that such events be handled on an ad hoc basis.
- Exceptions where a broad rule was defined (i.e. only employees of the company may see a document), and a user wanted to have the rule overridden (i.e. let an employee of our auditor see this document).
- Exceptions where some information, decision or rule necessary to advance the process is missing, and a participant insists that it be recorded or captured in the Process Thread before they are willing to allow their portion of the process to advance.
- Exceptions where a trigger or Process Service needs to access some information or to invoke a service, but the information or service either isn't available (i.e. they haven't been added to the thread, the requester doesn't know its address and can't find it, or the service provider is off-line); or the trigger or Process Service requesting it doesn't have access privileges or hasn't been authenticated properly.
- Exceptions where rules or preferences added by different people or systems conflict (i.e. a proposed contract is added to a request for bid thread with a security rule that it is only visible to employees of a particular department, and another purchasing approval thread requires that the contract be reviewed by the company's legal department before a purchase order can be completed.)
- Exceptions where an unanticipated contingency comes up (i.e. the purchase is over $1 million) or a situation for which there is no definitive process or rule, and a participant decides the process needs to be adapted on the fly (i.e. the CFO adds a separate approval by the board of directors).

Even in a traditional domain-specific enterprise application which has a fixed set of process maps that support a relatively limited range of variations, the code to handle such exceptions might make up as much as 90% of the total domain-specific code.

For a general purpose application that supports incremental process definitions defined on the fly by end users across any process domain, the number of possible exceptions that *might* occur would be multiple orders of magnitude higher. In fact, when you include the ability for end users to dictate arbitrary ad hoc changes to the process model itself, the number of potential exceptions is infinite. This is a principle reason why general purpose process automation applications have never previously been built—the sheer complexity and volume of the code providing for all of the potential exceptions would be overwhelming using traditional techniques.

The key to overcoming this challenge is the fact that although an infinite variety of exceptions *might* occur, the vast majority of them never will. For example, although it is theoretically possible that any given person might try to open a particular document, the vast majority of them never will, so there is no need to create an access rule for everyone, as long as you can handle a request acceptably when and if a request is made.

In a preferred embodiment, the Uniform Process Services will build upon the unique capabilities of Process Threads and Process Thead Servers to implement a standard set of Exception Handling Services to handle such exceptions in a variety of ways, including: p1 Policy-based Response: A set of rules or triggers within an exception handling policy service can be maintained that evaluates exceptions as they arise, and determines how they should be handled, and by whom or what service. Such policies could be specified at an arbitrary level of granularity, from being specific to an individual Process Thread or Participant to applying to all Process Thread and related content. In general, these exception handling policies would determine if a special purpose exception handling service is defined for that particular exception, and if not, evaluate which of the standard Exception Handling Services should handle it and dispatch it appropriately.

Just-in-time User Response: If an exception arises and the user who precipitated the exception is authorized and on-line, present a user-facing web service to the user (typically displayed within the same user interface context where the exception arose) and offer them the chance to resolve it. The user might be offered the chance to:

- Ignore the exception (i.e. accept that they don't have privileges to see a document and move on.)
- Override the exception and record the reason for their decision (i.e. indicate that they had read a hardcopy of a contract when a rule reminds them that there is no record of them opening the document they are approving.) A notification of such overrides might be sent to people who have appropriate authority and have registered interest in being notified of overrides. Further, override decisions might be subject to a veto by those with greater authority. Given that the just-in-time user exception handling service maintains an audit trail of the full context of override decisions, and that overrides are subject to notification and veto, it is likely that flexible rules subject to overrides would be much more accepted in practice.
- Escalate a request to override an exception by composing a message which would be handled by the appropriate Asynchronous exception handling service.
- Delegate the responsibility for handling the exception to someone else.

Asynchronous Escalation: If an exception arises and it is not handled by a specific exception handling service or just-in-time by the user, a request to handle the exception (including a view of the context necessary to respond) could be created and routed (typically via email) to the appropriate Party—generally the original author of the thread or a designated administrator. Such a party could designate a service to handle or screen such requests automatically, for example providing a white-list of people for whom certain categories of requests are automatically approved. Once the exception is handled, a message might be routed to the Party who was interrupted by the exception which could reconstruct the session context and let them pick up where they left off. The Asynchronous Escalation exception handler could support a configurable escalation path in the event of a non-response—providing that the request be escalated or abandoned after a certain period of time. This escalation path might also provide for appeals by the original requestor—for example, if the original request is denied, the requestor could respond with a request for another hearing, or an escalation to a Party with override authority. In such cases, the full thread would be available, so the new Party evaluating the request could easy evaluate the context.

Collaborative Escalation: This is a variation of an Asynchronous Escalation exception handler which supports iterative interaction by multiple parties who are involved and/or have authority or interest in how the exception is handled, and enables them to collaborate until a decision on how to handle the exception is arrived at. Typically a collaborative exception handler would spawn a new Process Thread related to whatever entity generated the exception. The Collaborative Escalation exception handler would maintain an audit trail of the full context of any decision made, and could be configured to default to or enforce arbitrary rules and steps for arriving at a decision.

Exception Logging Facility: The Exception Handling Service may provide an Exception Logging Facility that would record each exception that meets specified (and configurable) criteria, and the sequence of actions that followed to resolve the exception. Various authorized Parties may subscribe for notification of such exception events, and enforce oversight privileges for certain types of override decisions.

For each of the types of exception handling alternatives (JIT User Response, Asynchronous Escalation, Collaborative Escalation) there may be a variety of special purpose Process Services for specific types of exceptions. A few examples include:

Party Assignment Exception Handler: Exception handlers to assign a particular Person if a Process Thread includes a Party as a participant that does not resolve unambiguously into a specific Person (i.e. a Position, Role, Team, Group or Party Placeholder).

Authorization Exception Handler: Exception handlers to grant authorization to a particular user who is initially denied access.

Authentication Exception Handler: Exception handlers to allow the user to authenticate himself if a specific authenticated identity is required but not yet recorded by the user session.

WSDL Exception Handler: Handles exceptions yielded by a web service that describes its interface semantics in WSDL (Web Service Description Language). The exception handler parses the WSDL and the exception message generated by the web service, and determines if it can access appropriate logic to handle the exception automatically. In the case where the exception is based upon a missing parameter (say, the order number), the exception handler may search related Process Threads to find the missing information. If it is able to find the missing parameter unambiguously, it may call the web service again with the additional parameter automatically. If it cannot find an unambiguous answer, it could use the WSDL to generate a user interface which explains the exception and asks the user to provide the missing information, and presents possible candidates if any are known. It may provide the option for the user to save the full context as a new thread persistently, so he may return later and resume when possible or convenient.

2.5.2 Application Capture

One of the most difficult challenges with the traditional approach to automating end-to-end processes is application integration. The problem is two-fold. First, it is often not possible to know in advance which applications will need to be integrated in a given end-to-end process instance, because the composition of the process is often improvised. Second, transactional integration with enterprise applications is inherently difficult, requiring an understanding of the semantics of the application interface, as well as security privileges (including a method to authenticate identity and authorization for the necessary types of transactions) to that interface. Often it is simply not worth the trouble of whomever controls one or both of the application interfaces to bother with integration unless it is a high-volume, high-value or highly time-sensitive type of transaction.

It is not feasible to rely exclusively on the traditional style of transactional integration for a general purpose process automation application that enables ad hoc improvised processes, because the associated delays and expense would be prohibitive.

The present inventions provide an ad hoc, just-in-time domain neutral Application Capture service that can serve as a pragmatic partial substitute to transactional integration. Application Capture simply captures one or more renderings of the user-interface of an application transaction and stores them in a Content Wrapper, rather than interacting through application interface transactions.

Generally speaking, most enterprise applications have more complete and accessible human interfaces than they do transactional application interfaces. Some of the participants in the process will likely have the necessary authorization and expertise to navigate to and access views of the information stored in each application that needs to be shared with other participants or stored for audit trail purposes. Such information might be invoices, purchase orders, bills of ladings, delivery schedules, etc.

In one embodiment for web-based applications, the Application Capture service would be implemented as a Web Browser tool-bar add-in. The add-in would expose a 'Capture Page' button which, when clicked, would spider the page displayed in the browser, converting it into an image file (such as a .JPG or .GIF) and a web archive (.mht file) that stores the html and images as a discrete file. Each of these formats, along with the URL and other session state at the time of capture, is then uploaded into a Content Wrapper which can be added to a new or existing Process Thread. By implementing the Application Capture service as a client-side add-in, so it would capture exactly the same view the user was looking at, avoiding any complications related to cookie-based personalization or security features.

Although using transactional integration or capturing user-facing web services would be in many cases be superior to Application Capture, having a just-in-time ad hoc alternative is a far more pragmatic approach. Often, there really isn't a requirement to actually integrate applications—it is enough to get snap shots of information stored in different systems persistently stored in the context of the overall process either to facilitate decision making, or to provide a persistent audit trail. For example, a Process Thread might contain captured copies of an invoice from the vendor's billing application, a purchase order from the customer's payment management system, and a bill of lading and delivery confirmation from FedEx's web site. If the invoice were updated, the new version could be captured and automatically marked as superseding the earlier version, which would be retained as part of the audit trail. Since most application transactions of this nature (invoices and purchase orders) don't change once they are created anyway, the additional benefit of having a live interface into the source application is limited.

3 Thread Applications

According to one embodiment of the invention, a domain-specific enterprise application, referred to here as a Thread Application, may be able to interact (either natively or via an adapter or gateway) with Process Threads or Thread Servers in one or more ways, including:

- Interact with process thread content via a thread-aware application programming interface (Thread API). Such interactions might include querying process threads; invoking Process Thread Services (notification, approval, request document, etc.) with content provided by the Thread Application; updating Process Threads with additional messages, content, rules; or adding new Process Threads and linking them to existing Process Webs.
- Expose some portion of the Thread Application's functionality as one or more self-contained (possibly user-facing) web services which can be invoked and configured via a Thread API—referred to as Process Services (or Process Content). These can be attached to a Process Thread, and can communicate or coordinate with other process thread content as necessary via the Thread API.
- Expose external process thread content (including Process Services hosted by other Thread Applications) within its own native user interface. Such external process thread content may be displayed directly as a user-facing web service, or may be imported via a thread-aware API and transformed via an adapter into a native user interface.

A Thread Application may be an existing application (ERP, CRM, configuration management, etc.), or may be a new domain-specific application build from the ground up to take advantage of Process Threads.

4 Process Packs

According to one embodiment of the invention, reusable/configurable domain-specific thread templates, referred to here as a Process Pack, may be used. A Process Pack may also include domain-specific web services or enterprise applications or software infrastructure or services implemented on various platforms. To the extent that enterprise applications or external software services are included in a Process Pack, they will include thread-service enabled adapters or wrappers that allow them to function as Thread Applications that interact with or coexist with Process Threads and thread templates.

A Thread Template is a Process Thread that may include forms, triggers, content, rules, placeholders and other content in order to enforce or facilitate domain-specific processes. End users may dynamically include instances of threads from an arbitrary number of Process Packs into a single set of related Process Threads.

A normal Process Thread that was created on an ad hoc basis by an end user may be used as a thread template without modification. (This might be thought of as process copy-paste-edit.) Although Process Packs typically rely upon Process Thread Servers or other thread execution services in order to function, a Process Pack can be packaged separately and downloaded dynamically on a per-instance basis.

A Process Pack (which may include domain-specific or specialized thread templates, Thread Interface Components, Process Service Providers and Thread Applications) may be registered with a Process Thread Server, which in turn will register an additional set of Process Services with the Service Dispatcher.

5 Process Web

According to one embodiment of the invention, a set of related Process Threads, referred to here as a Process Web, may be distributed across different Process Thread Servers, which may incorporate Process Packs and Thread Applications. The Process Web unifies content drawn from various sources (possibly including email, web, enterprise applications, desktop productivity applications etc.) into a coherent process context, and enables either a partitioned and/or global mechanism for users to navigate, interact with or update that content via pre-existing client infrastructure technology such as standard email clients or web browsers. The Process Web grows continuously as the underlying real world processes unfold. The Process Web facilitates the execution of those processes by providing a unified and secure mechanism to navigate, search and interact with and analyze what would otherwise have been many different islands of automation, collaboration. Further, the Process Web automatically recreates a robust audit trail of the processes it facilitates, including of a log of how each one unfolded, and of their interrelationships.

The Process Web provides a unified and global mechanism for navigating among and accessing rich information content and underlying applications via standard browsers and internet infrastructure, whereas previously it was necessary for individual applications or forms of content to be accessed via a particular type of client application, and there were no uniform mechanisms for navigating among and accessing such applications and information content.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for automating organization of multiple processes comprising:
   managing by a server, a uniform record of process threads, each process thread supporting a plurality of users;
   manipulating by the server, the uniform record of process threads;
   coupling a storage device to the server;
   storing the uniform record of process threads on the storage device;
   receiving by the server, data from a client computer modifying the uniform record of process threads; and
   modifying by the sever, the uniform record of process threads stored on the storage device in response to the data received from the client computer.

2. The method of claim 1 wherein the modifying step comprises generating a new process thread.

3. The method of claim 1 wherein the modifying step comprises modifying the at least one of the process threads.

4. The method of claim 1 wherein at least one of the process threads reflects user actions carried out by more than one of the plurality of users.

5. The method of claim 1 wherein one of the different types of application programs is an email application program.

6. The method of claim 1 wherein one of the different types of application programs is a web application program.

7. The method of claim 1 wherein one of the different types of application programs is an enterprise application program.

8. The method of claim 1 further comprising a step of:
associating a piece of electronic content to at least one process thread in the uniform collection of process threads;
wherein the piece of electronic content is a piece of content selected from the group consisting of an application transaction record, a document, a form, a web page, a fax, and an email.

9. The method of claim 1 wherein the modifying step includes modifying the process threads stored in the uniform record of process threads can be created or modified with security in the form of limited visibility, authentication and authorization protections with respect to users, application program types or content.

10. The method of claim 1 further comprising a step of
applying by the server, a predefined process service to at least one process thread in the uniform collection of process threads, wherein the predefined process service provides a specific function to serve the at least one process thread.

11. The method of claim 1 further comprising a step of
applying a predefined thread service to at least one process thread in the uniform collection of process threads, wherein the predefined thread service manages operations associated with the at least one process thread.

12. The method of claim 1 wherein collaboration process threads are created and modified with security in the form of limited visibility, authentication & authorization protections with respect to users, application program types and content.

13. An apparatus for automating organization of multiple processes comprising:
at least one server for managing and manipulating a uniform record of process threads, each process thread supporting a plurality of users;
a storage device coupled to at least one server for storing the uniform record of process threads;
a plurality of client computers coupled to the at least one server for enabling the plurality of users to carry out user actions against multiple types of application programs; and
wherein actions of the plurality of users modify the uniform record of process threads.

14. The apparatus of claim 13 wherein the at least one server is capable of modifying the uniform record of process threads stored on the storage device by storing a new process thread generated by one of the plurality of client computers.

15. The apparatus of claim 13 wherein the at least one server is capable of modifying the uniform record of process threads stored on the storage device by storing at least one process thread after it has been modified by one of the plurality of client computers.

16. The apparatus of claim 13 wherein at least one of the process threads includes data provided by more than one of the plurality of client computers.

17. The apparatus of claim 13 wherein one of the different types of application programs is an email application program.

18. The apparatus of claim 13 wherein one of the different types of application programs is a web application program.

19. The apparatus of claim 13 wherein one of the different types of application programs is an enterprise application program.

20. The apparatus of claim 13 wherein the at least one server is further capable of associating a piece of electronic content to at least one process thread in the uniform collection of process threads and wherein the piece of electronic content is a piece of content selected from the group consisting of an application transaction record, a document, a form, a web page, a fax, and an email.

21. The apparatus of claim 13 wherein the modifying step includes modifying the process threads stored in the uniform record of process threads can be created or modified with security in the form of limited visibility, authentication and authorization protections with respect to users, application program types or content.

22. The apparatus of claim 13 wherein the at least one server is further capable of applying a predefined process service to at least one process thread in the uniform collection of process threads, wherein the predefined process service is capable of providing a specific function to serve the at least one process thread.

23. The apparatus of claim 13 wherein the at least one server is further capable of applying a predefined thread service to at least one process thread in the uniform collection of process threads, wherein the predefined thread service manages operations associated with the at least one process thread.

24. The apparatus of claim 13 wherein at least one of the process threads is comprised of a plurality of process primitives, each process primitive corresponding to at least one basic function relating to operation of a process.

25. A system for automating organization of multiple processes comprising:
means for managing by a server, a uniform record of process threads using at least one server, each process thread supporting a plurality of users;
means for manipulating by the server, the uniform record of process threads;
means for coupling a storage device to the server;
means for storing the uniform record of process threads on the storage device;
means for receiving by the server, data from a client computer modifying the uniform record of process threads; and
means for modifying by the sever, the uniform record of process threads stored on the storage device in response to the data received from the client computer.

* * * * *